United States Patent
Takenaka et al.

(10) Patent No.: US 7,112,938 B2
(45) Date of Patent: Sep. 26, 2006

(54) ATTITUDE CONTROL DEVICE OF MOBILE ROBOT

(75) Inventors: Toru Takenaka, Wako (JP); Tadaaki Hasegawa, Wako (JP); Takashi Matsumoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/512,819

(22) PCT Filed: Apr. 18, 2003

(86) PCT No.: PCT/JP03/04990

§ 371 (c)(1),
(2), (4) Date: Oct. 28, 2004

(87) PCT Pub. No.: WO03/092968

PCT Pub. Date: Nov. 13, 2003

(65) Prior Publication Data

US 2005/0104548 A1    May 19, 2005

(30) Foreign Application Priority Data

May 1, 2002    (JP) .............................. 2002-129919

(51) Int. Cl.
  *B25J 5/00*    (2006.01)
  *B25J 13/00*    (2006.01)
  *G06F 19/00*    (2006.01)
(52) U.S. Cl. .............................. 318/568.12; 318/568.11; 318/568.17; 700/245; 700/260; 901/1
(58) Field of Classification Search .................... None
See application file for complete search history.

(56) References Cited

U.S. PATENT DOCUMENTS

| 4,834,200 | A  | * | 5/1989  | Kajita ........................... 901/1 |
| 5,155,423 | A  | * | 10/1992 | Karlen et al. ........... 318/568.11 |
| 5,404,086 | A  | * | 4/1995  | Takenaka et al. ....... 318/568.12 |
| 5,513,106 | A  | * | 4/1996  | Yoshino et al. ................ 701/23 |
| 6,377,014 | B1 | * | 4/2002  | Gomi et al. ........... 318/568.12 |
| 6,505,096 | B1 | * | 1/2003  | Takenaka et al. ........... 700/245 |
| 6,527,071 | B1 | * | 3/2003  | Villedieu ........................ 901/1 |
| 6,651,766 | B1 | * | 11/2003 | Kamen et al. .............. 180/218 |
| 6,697,709 | B1 | * | 2/2004  | Kuroki et al. ............... 700/245 |
| 6,865,446 | B1 | * | 3/2005  | Yokono et al. .............. 700/245 |
| 6,898,485 | B1 | * | 5/2005  | Kuroki et al. .............. 700/245 |
| 6,969,965 | B1 | * | 11/2005 | Takenaka et al. ....... 318/568.12 |
| 2002/0022907 | A1 | * | 2/2002  | Takenaka et al. ........... 700/245 |
| 2003/0116363 | A1 | * | 6/2003  | Villedieu .................... 180/8.1 |

(Continued)

FOREIGN PATENT DOCUMENTS

EP    965416 A1    12/1999

(Continued)

*Primary Examiner*—Lincoln Donovan
*Assistant Examiner*—Eduardo Colon Santana
(74) *Attorney, Agent, or Firm*—Squire, Sanders & Dempsey L.L.P.

(57) ABSTRACT

A posture control system for a mobile robot. When an unexpected external force acts, the system is configured to control and stabilize the posture of the robot driving an arm link such that, in response to a first external force that is a component in a predetermined direction of an unexpected external force, a second external force acts on the arm link in a direction orthogonal to the predetermined direction. With this, when the mobile robot receives a reaction force, even if the posture becomes unstable or the robot receives an unexpected reaction force, it becomes possible to preserve the dynamic balance and to maintain a stable posture.

5 Claims, 25 Drawing Sheets

U.S. PATENT DOCUMENTS

2005/0038560 A1* 2/2005 Nagasaka .................. 700/245
2005/0121238 A1* 6/2005 Ishii ......................... 180/65.1

FOREIGN PATENT DOCUMENTS

| JP | 62233811 A | * 10/1987 |
| --- | --- | --- |
| JP | 07-205070 | 8/1995 |
| JP | 7-205070 A | 8/1995 |
| JP | 10-230485 | 9/1998 |

* cited by examiner

ATTITUDE CONTROL DEVICE OF MOBILE ROBOT

TECHNICAL FIELD TO WHICH THE INVENTION RELATES TO

The present invention relates to a posture control system of a mobile robot, and specifically to a control system for ensuring a stable posture of a mobile robot, in particular a biped mobile robot or a wheel mobile robot having an arm(s), when the robot is controlled to perform a work that is likely to receive a reaction force from an object through the arm.

BACKGROUND ART OF THE INVENTION

The applicant discloses a posture control system of a legged mobile robot, for mobile robots, in Japanese Laid-Open Patent Application No. Hei 10 (1998)-230485. In this prior art, it is configured to displace the position of the center of gravity of the robot by correcting a posture gradually over a long period of time to displace a body of the robot so as to generate a moment of gravity for compensation, so as to maintain or preserve the dynamic balance, in particular the equilibrium that balances robot posture dynamically, when the robot receives an unexpected reaction force from an object. At the same time it is configured, during a transient period, to preserve the dynamic balance by driving a foot to move to take a posture to brace legs, so as to generate a total floor reaction force's moment for compensation about a desired floor reaction force central point (that is equal to a desired ZMP).

Thus, in the aforesaid prior art, if unexpected reaction force acting from the object changes abruptly, at that moment (in a short period of time), the robot is operated to move the foot to brace legs in order to maintain or preserve the dynamic balance. That is to say, the prior art ensures to stabilize the posture by generating the total floor reaction force's moment.

Further, the applicant proposes a technique (in Japanese Laid-Open Patent Application No. Hei 10 (1998)-277969) to generate a moment as a total floor reaction force's moment actively to restore a posture of the robot when the posture is tilted or inclined, regardless of whether the robot receives a reaction force from the object. However, since the total floor reaction force's moment generated by the aforesaid technique has a limit, if trying to generate the total floor reaction force's moment beyond the limit, a part of a foot may be lifted up, resulting in the robot losing the dynamic balance or, at worst, tipping over.

Furthermore, the applicant also proposes a technique to maintain the dynamic balance by correcting a body trajectory of a robot, instead of generating a total floor reaction force's moment (in Japanese Patent No. 3269852). In the prior art, however, since a foot landing position, etc., is needed to be corrected, if the robot is controlled to work with the object by using the arm, the body or foot may sometimes be likely move from an appropriate position for working.

In addition, in the case that the robot is controlled to work to impart some motion to an object, in order to accomplish a task as expected, it is preferable not to influence on a motion of the object, when a control to maintain the dynamic balance or to restore a tilted or inclined posture of the robot is implemented.

DISCLOSURE OF THE INVENTION

A first object of the present invention is to eliminate the above-mentioned drawbacks, and to provide a posture control system of a mobile robot that can preserve the dynamic balance so as to maintain a stable posture, if the robot loses a stable posture or if the robot receives an unexpected reaction force from an object, when the robot performs a work that is likely to receive a reaction force from the object.

Further, a second object of the present invention is to provide a posture control system of a mobile robot that can preserve the dynamic balance so as to maintain a stable posture, if the robot loses a stable posture or if the robot receives an unexpected reaction force from an object, when the robot performs a work that is likely to receive a reaction force from the object, without operating or manipulating a floor reaction force acting from the surface which the robot contacts or with decreasing the amount of the manipulated variable of the floor reaction force.

Further, a third object of the present invention is to provide a posture control system of a mobile robot that can preserve the dynamic balance so as to maintain a stable posture, if the robot loses a stable posture or if the robot is subject to an unexpected reaction force acting from an object, when the robot is controlled to perform a work that is likely to receive a reaction force from the object, without giving an influence on a motion of the object.

In order to achieve the first object, as recited in claim 1 mentioned below, the present invention is arranged to provide a posture control system of a mobile robot having at least a body, a locomotive mechanism and at least one arm link that can act a force on an object; characterized in that; when unexpected external force acts, the arm link is driven such that, in response to a first external force that is a component in a predetermined direction of the unexpected external force, a second external force acts on the arm link in a direction orthogonal to the predetermined direction, whereby a posture of the robot is stabilized. Thus, in the posture control system of a mobile robot, when unexpected external force acts, it is configured to control to stabilize the posture of the robot driving the arm link such that, in response to the first external force that is the component in a predetermined direction of the unexpected external force, the second external force acts on the arm link in a direction orthogonal to the predetermined direction. With this, when the mobile robot is controlled to work that is likely to receive a reaction force from an object, even if the posture becomes unstable or the robot receives the unexpected reaction force acting from the object, it becomes possible to preserve the dynamic balance and to maintain a stable posture.

As recited in claim 2 mentioned below, the present invention is arranged to provide a posture control system of a mobile robot having at least a body, a locomotive mechanism and at least one arm link that can act a force on an object; characterized in that: desired motion generating means for generating desired motion comprising at least a desired arm link position/posture of the robot and a desired object reaction force that is a desired value of an object reaction force acting on the arm link from the object; actual object reaction force detecting means for detecting or estimating an actual object reaction force that is an actual value of the object reaction force; posture stabilization controlling means for correcting the desired motion to stabilize a posture of the robot based on at least the detected or estimated actual object reaction force; and an arm driver driving the arm link based on at least the corrected desired motion. Thus, the posture control system of a mobile robot is configured to generate the desired motion comprising at least the desired arm link position/posture of the robot and the desired object reaction force that is a desired value of the object reaction force acting on the arm link from the object; to detect or estimate the actual object reaction force that is the actual value of the object reaction force; to correct the desired motion to stabilize the posture of the robot based on at least the detected or estimated actual object reaction force; and to include the arm driver that drives the arm link based on at least the corrected desired motion. With this, when the mobile robot is controlled to work that is likely to receive a reaction force from an object, even if the posture becomes unstable or the robot receives the unexpected reaction force acting from the object, it becomes possible to preserve the dynamic balance and to maintain a stable posture.

As recited in claim 3 mentioned below, the present invention is arranged such that the posture stabilization controlling means corrects the desired motion to stabilize the posture of the robot based on at least an object reaction force's error indicating a difference between the actual object reaction force and the desired object reaction force. Thus, since the desired motion is corrected to stabilize the posture of the robot based on at least the object reaction force's error indicating the difference between the actual object reaction force and the desired object reaction force, it becomes possible to obtain the aforesaid effects and advantages to a further extent.

As recited in claim 4 mentioned below, the present invention is arranged such that the posture stabilization controlling means corrects the desired motion to cancel out all or a part of tilting force generated by a first component of the object reaction force's error by a second component obtained from the first component. Thus, since the desired motion is corrected to cancel out all or a part of tilting force generated by the first component of the object reaction force's error by the second component obtained from the first component, it becomes possible to obtain the aforesaid effects and advantages to a further extent.

As recited in claim 5 mentioned below, the present invention is arranged to provide a posture control system of a mobile robot having at least a body, a locomotive mechanism and at least one arm link that can act a force on an object; characterized in that: desired motion generating means for generating desired motion comprising at least a desired arm link position/posture of the robot and a desired object reaction force that is a desired value of an object reaction force acting on the arm link from the object; posture stabilization controlling means for detecting a posture inclination error of the robot and for correcting the desired motion such that the posture inclination error approaches zero; and an arm driver driving the arm link based on at least the corrected desired motion. Thus the posture control system of a mobile robot is configured to generate the desired motion comprising at least the desired arm link position/posture of the robot and the desired object reaction force that is the desired value of the object reaction force acting on the arm link from the object; to detect the posture inclination error of the robot and to correct the desired motion such that the posture inclination error approaches zero; and to drive the arm link based on at least the corrected desired motion. With this, when the mobile robot is controlled to work that is likely to receive a reaction force from an object, even if the posture becomes unstable or the robot receives the unexpected reaction force acting from the object, it becomes possible to preserve the dynamic balance and to maintain a stable posture.

It should be noted that, in claims and detailed description of the preferred embodiments, the "mobile robot" includes a mobile robot that receives the object reaction force through a portion(s) other than the arm link(s). With respect to the arm links, it should also be noted that the arm links would include any link(s), even the leg link(s) if the leg link(s) can act on the object. For example, if the robot is in an insect-type having six leg links which lifts the object using the two foreleg links, the two foreleg links should be regarded as the arm link(s).

It should further be noted that the "position/posture" is used to indicate the "position and/or posture". In other words, the "position/posture" does not necessarily include both "position" and "posture".

DETAILED DESCRIPTION OF THE PREFERRED EMBODIMENTS

A posture control system of a mobile robot according to an embodiment will be explained with reference to the accompanied drawings.

Figure 1:
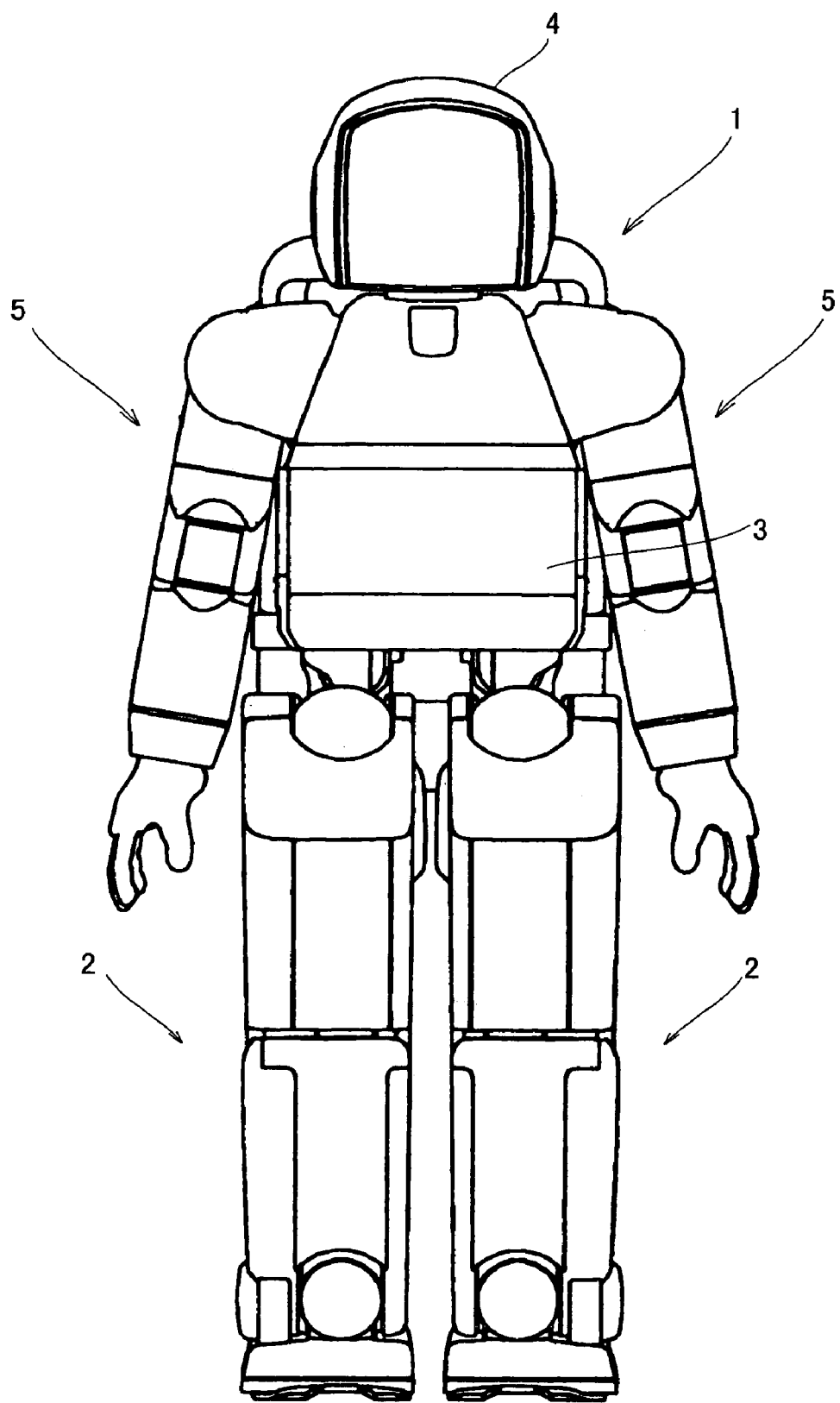
FIG. 1 is a front view of a legged mobile robot to which a posture control system of a mobile robot according to an embodiment of the present invention is applied.
Figure 2:
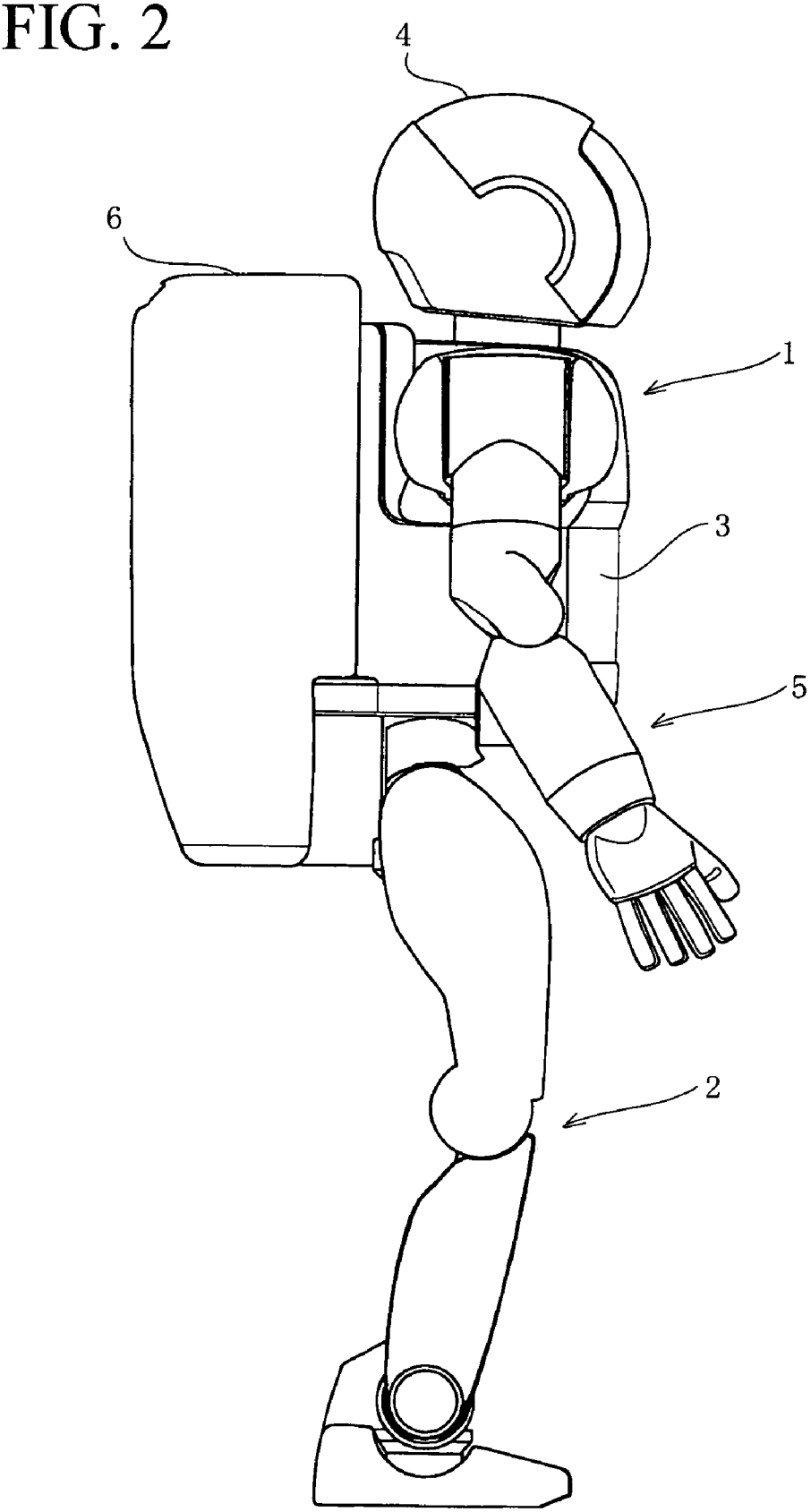
FIG. 2 is a side view of the robot illustrated in FIG. 1.

FIG. 1 is a front view of a legged mobile robot to which the posture control system of the mobile robot according to the embodiment is applied and FIG. 2 is a side view of the robot. Here, the legged mobile robot in a humanoid type that has two leg links and two arm links is taken as an example of the mobile robot.

As illustrated in FIG. 1, the legged mobile robot (hereinafter referred to as "robot") 1 has a plurality of, specifically two leg links (or legs) 2 and a body (trunk) 3 on the upper side thereof. A head 4 is provided above the body 3 and two arm links (arms) 5 are each connected to the both sides of the body 3. A housing section 6 is disposed on the back of the body 3 and an electronic control unit (explained later) or the like is installed therein. The robot 1 illustrated in FIGS. 1 and 2 is covered to protect the internal structure from being damaged.

Figure 3:
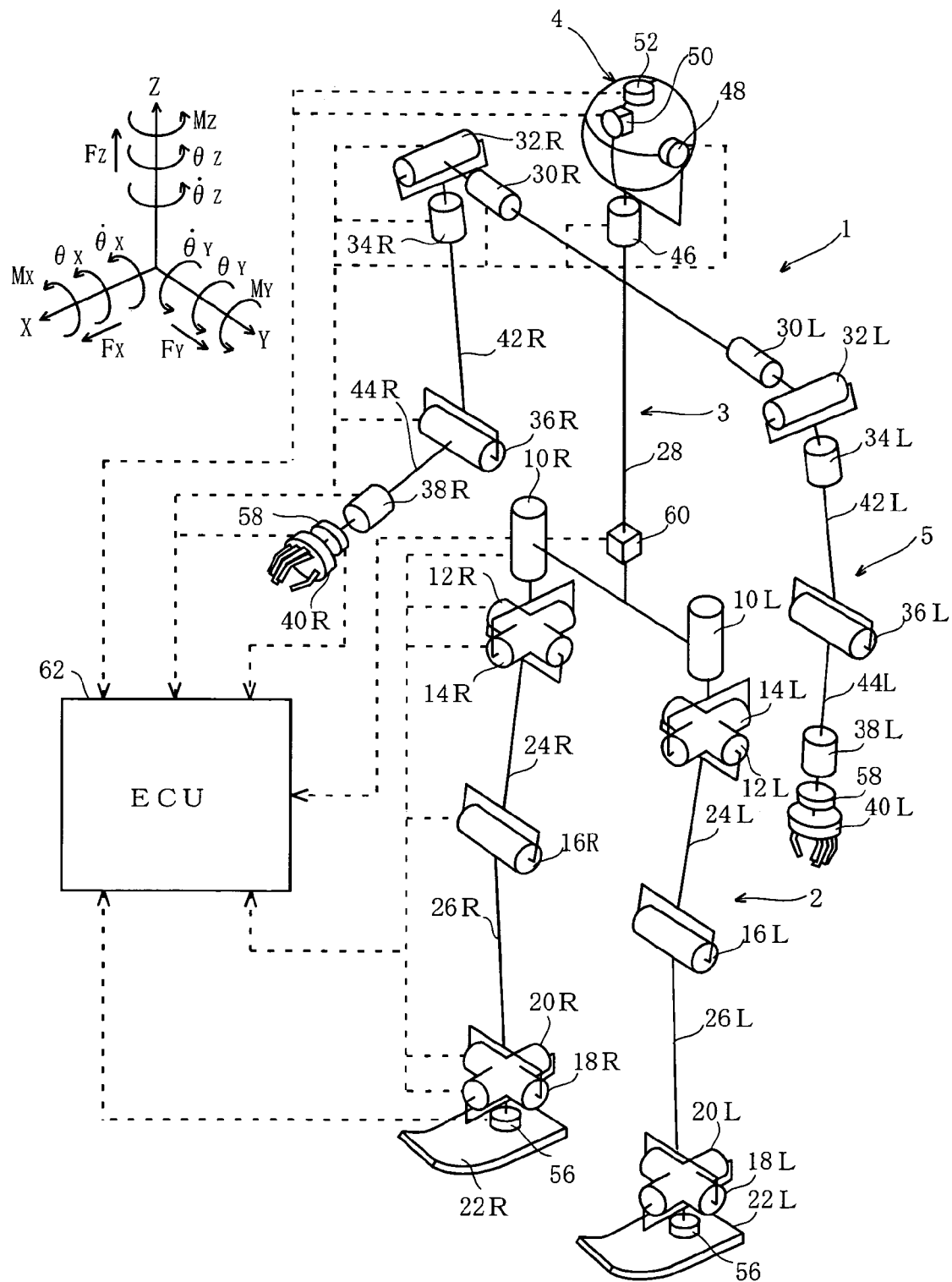
FIG. 3 is an explanatory view of the robot illustrated in FIG. 1 in a skeleton manner.

FIG. 3 is an explanatory view of the robot illustrated in FIG. 1 in a skeleton manner. Explaining the internal structure by focusing on joints with reference to the figure, as illustrated, the robot 1 has six joints to be driven by eleven electric motors at each pair of right and left leg links 2 and arm links 5.

Specifically, the robot 1 is provided at its waist (hips) a pair of electric motors 10R, 10L (the right-hand side is indicated by R and the left-hand side by L; hereinafter the same) for driving joints to rotate each leg link 2 about a vertical axis (a Z-axis or a vertical or gravitational axis), a pair of electric motors 12R, 12L for driving joints to rotate each leg link 2 in the pitching (advancing) direction (about a Y-axis), a pair of electric motors 14R, 14L for driving joints to rotate each leg link 2 in the rolling (left and right) direction (about an X-axis), a pair of electric motors 16R, 16L at the knees for driving knee joints to rotate the lower portion of each leg link 2 in the pitching direction (about a Y-axis), a pair of electric motors 18R, 18L at the ankles for driving ankle (foot) joints to rotate the distal end of each leg link 2 in the pitching axis (about a Y-axis), and a pair of electric motors 20R, 20L for driving the ankle joints to rotate the same in the rolling axis (about an X-axis).

As mentioned above, in FIG. 3, the joints are indicated by rotating axes of the electric motors (or transmission components, such as a pulley, that are connected to the electric motors to transmit the power thereof). A feet 22R, 22L are disposed at each distal ends of the leg link 2.

Thus, the electric motors 10R(L), 12R(L), 14R(L) are located at the hip joints (waist joint) of the leg links 2 such that their rotating axes cross orthogonally, and the electric motors 18R(L), 20R(L) are also located at the ankle joints such that their rotating axes cross orthogonally. The hip joints and knee joints are connected to each other by thigh links 24R(L), and the knee joints and ankle joints are connected to each other by crus links 26R(L).

The leg links 2 are connected to the body 3 via the hip joints. In FIG. 3, the body 3 is expressed as a body link 28 for ease of illustration. As mentioned above, the arm links 5 are connected to the body 3.

The arm links 5 are constituted in a manner similar to the leg links 2. Specifically, the robot 1 is provided at its shoulders with a pair of electric motors 30R, 30L for driving joints to rotate each arm link 5 in the pitching direction, a pair of electric motors 32R, 32L for driving joints to rotate each arm link 5 in the rolling direction, a pair of electric motors 34R, 34L for driving joints to rotate the free end of each arm link 5, a pair of electric motors 36R, 36L at the elbows for driving joints to rotate a portion lower than each elbow and a pair of electric motors 38R, 38L at the distal ends of the arms for driving the wrist joints to rotate the respective distal ends. Hands (end effectors) 40R, 40L are connected to each distal end of the wrists.

The electric motors 30R(L), 32R(L), 34R(L) are located at shoulder joints of the arm links 5 such that their rotating axes cross orthogonally. Each of the shoulder joints and elbow joints is connected to each other by an upper arm link 42R(L) and each of the elbow joints and wrist joints is connected to each other by a forearm link 44R(L).

The head 4 is connected to the body 3 via a neck or head joint 46 that rotates about the vertical axis and a head swinging mechanism 48 that rotates the head 4 about an axis perpendicular to the vertical axis. As shown in FIG. 3, a vision sensor 50 constituted as a CCD camera that outputs a signal indicative of a taken image and an audio input/output device 52 made up of a receiver and a microphone are disposed in the head 4.

With the above structure, each of the left and right leg links 2 is provided with six joints so as to be given twelve degrees of freedom in total. When the six joints are driven to suitable angles (joint displacement), a desired motion is imparted to the leg links 2 to enable the robot 1 to walk arbitrarily in an environment of three-dimensional space. Similarly, each of the left and right arm links 5 is provided with five joints so as to be given ten degrees of freedom in total. When the five joints are driven to suitable angles (joint displacement), it becomes possible to control the robot 1 to perform a desired work. Also, the head 4 is provided with the joint and the head swinging mechanism so as to be given two degrees of freedom. By driving them to suitable angles, the robot can turn the head 4 in a desired direction.

The electric motors such as 10R(L) are coupled with respective rotary encoders (not shown) that generate signals indicative of at least one among an angle, angular velocity and angular acceleration of a corresponding joint via rotation of rotating axes of electric motors.

A known six-axis force sensor (hereinafter referred to as "force sensor") 56 is disposed at each foot 22R(L), and generates a signal indicating three directional components Fx, Fy, Fz of floor reaction force that acts on the robot from the contact surface, among external forces acting on the robot, and three directional components Mx, My, Mz of moment of the force.

A similar force sensor (six-axis force sensor) 58 is disposed at a location between each wrist joint and the hand 40R(L), and generates a signal indicating an external force other than the floor reaction force that acts on the robot, specifically, three directional components Fx, Fy, Fz of the external force (object reaction force) acting on the hand 40R(L) from the object and three directional components Mx, My, Mz of moment of the force.

Moreover, the body 3 has an inclination sensor 60 that generates a signal indicative of at least one of inclination (inclination angle) and its angular velocity of the body 3 with respect to the vertical axis, i.e., a state variable indicating the inclination (posture) of the body 3 of the robot 1.

The outputs of the force sensor 56, etc., are sent to an Electronic Control Unit (hereinafter referred to as "ECU") 62 comprising a microcomputer, which is stored in the housing section 6 on the back of the body 3 of the robot 1 (shown in FIG. 2; for brevity of illustration, only the right side of the robot 1 is shown).

Figure 4:
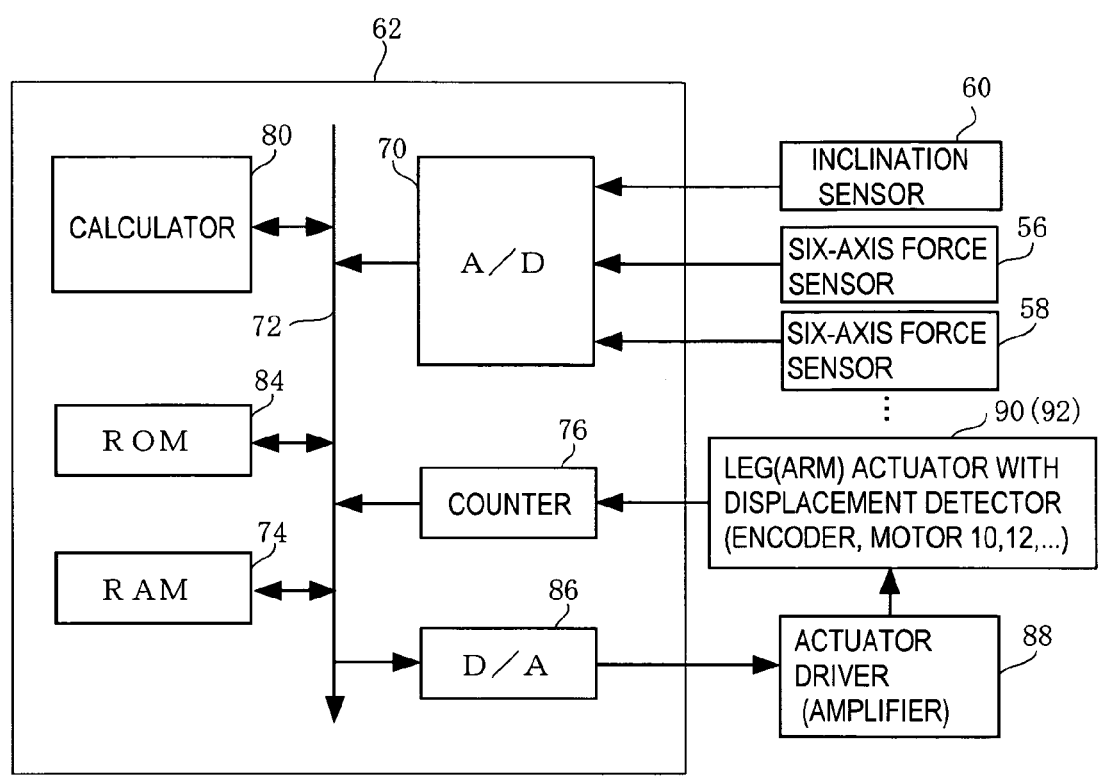
FIG. 4 is a block diagram showing in detail an electronic control unit (ECU) or the like illustrated in FIG. 3.

FIG. 4 is a block diagram showing details of the ECU 62, which is constituted as a microcomputer. The outputs from the inclination sensor 60, etc., are converted by an A/D converter 70 into digital values, that are transmitted to a RAM 74 through a bus 72. The outputs from the encoders disposed adjacent to the respective electric motors in respective actuators are transmitted to the RAM 74 through a counter 76.

The ECU 62 includes a calculator 80 comprising a CPU. The calculator 80 calculates joint angle displacement commands (actuator displacement commands) based on a gait generated by itself such that the robot can keep a stable posture, and outputs the commands to the RAM 74. Here, the reference numeral 84 indicates a ROM.

Moreover, the calculator 80 reads out the commands and the detected actual values from the RAM 74, and calculates control inputs (manipulated variables) necessary for driving the respective joints and outputs the same, through a D/A converter 86 and actuator drivers (amplifiers) 88, to the electric motors 10R(L), 12R(L) etc. of a leg actuators 90 and an arm actuator 92 with displacement detectors (encoders) that drive the respective joints.

Figure 5:
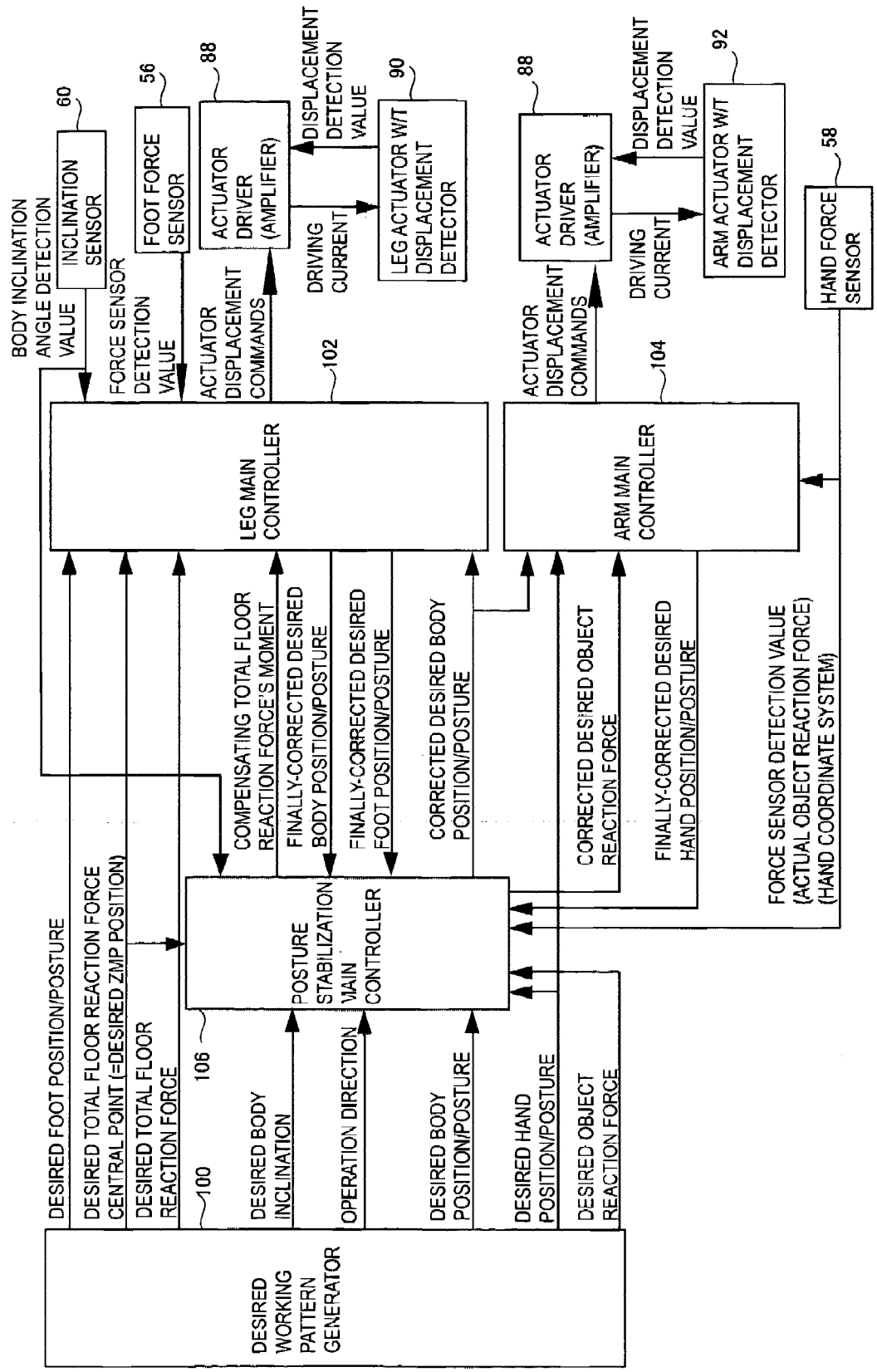
FIG. 5 is a block diagram showing the configuration of the posture control system of a mobile robot according to the embodiment of the present invention.

FIG. 5 is a block diagram showing the configuration and operation of the posture control system of the mobile robot (that mainly corresponds to the above-mentioned calculator 80) according to the embodiment.

This system is a system that controls the motions of the legs and arms in an unified manner, calculates the manipulated variables and outputs the same as the actuator displacement commands to the actuator drivers 88 to operate the leg actuators 90 and the arm actuators 92, as will be explained below. As illustrated, the system includes a desired working pattern generator 100, a leg main controller 102, an arm main controller 104 and a posture stabilization main controller 106 and other components.

The desired working pattern generator 100 generates the desired working pattern including a gait of the robot 1 that satisfies the dynamic equilibrium condition at a presumed condition. The desired working pattern is described by time variant patterns in a plurality of variables. The variables comprise those describing motions and the reaction forces acting from the working environment.

The variables describing motions are a combination or set of variables that can solely determine a robot posture at every instant. Specifically, they comprise a desired foot position/posture, a desired body position/posture, and a desired hand position/posture.

The variables describing the reaction force acting from the working environment comprise a desired total floor reaction force central point, a desired total floor reaction force and a desired object reaction force, as will be explained below.

Figure 6:
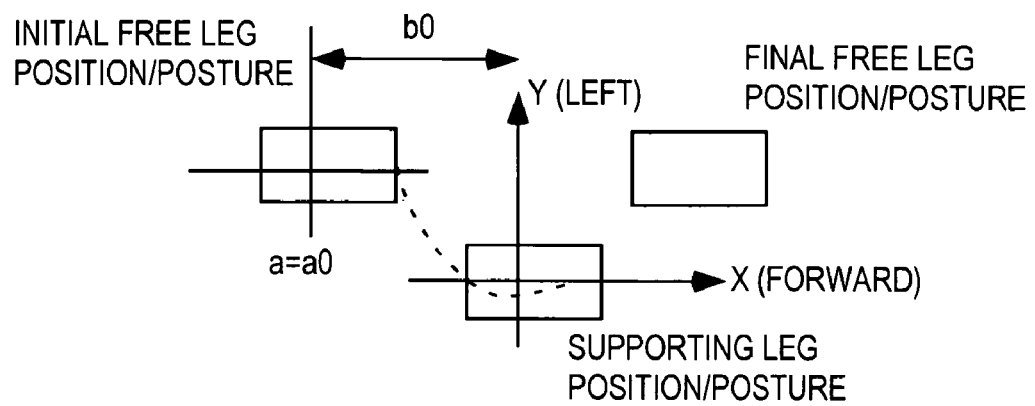
FIG. 6 is an explanatory view showing the supporting leg coordinate system in a gait generated by a desired working pattern generator of the system illustrated in FIG. 5.
Figure 7:
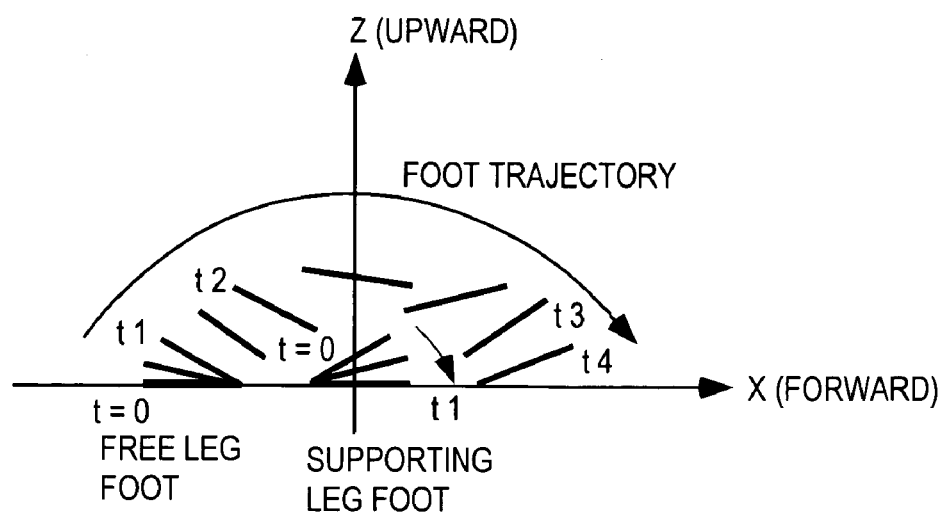
FIG. 7 is an explanatory view, similar to FIG. 6, and showing the supporting leg coordinate system in a gait generated by the desired working pattern generator of the system illustrated in FIG. 3.

These variables are expressed by a supporting leg coordinate system. The supporting leg coordinate system is a coordinate system whose origin is set at a point on the sole of foot 22R(L) of the supporting leg, projected vertically down from the ankle (the intersection of rotating axis lines of the electric motors 18, 20R(L) for driving foot joints). More specifically, as illustrated in FIGS. 6 and 7, the coordinate system is fixed on the floor with which the supporting leg foot sole is in contact, in which the advancing or forward direction (orientation) of the supporting leg foot is defined as the direction of X-axis, the left direction is defined as the direction of Y-axis and the vertical upward direction is the direction of Z-axis.

The variables will be explained in detail in the following.

The "object reaction force" indicates, among the external forces that the robot 1 receives in the environment, the external force other than the respective foot floor reaction forces. Specifically, it indicates the reaction force that acts on the hand 40R(L) from the object (e.g., door handle). A desired value thereof is called the "desired object reaction force".

The desired object reaction force outputted from the desired working pattern generator 100 is expressed by force and moment acting about the desired total floor reaction force central point (explained below). What is significant for the posture stabilization is the moment component thereof.

Explaining the desired total floor reaction force and desired total floor reaction force central point (position), the resultant force of the desired floor reaction forces that the respective feet receive from the floor during working is called the "desired total floor reaction force in a broad sense". The desired total floor reaction force in a broad sense is expressed by a point of action and a force and moment of force acting about the point of action. The desired total floor reaction force central point (position) is a floor point at which the moment components about the X-axis and the Y-axis are both zero (0), when the desired total floor reaction force is expressed by a force and moment whose point of action is set at that floor point.

The desired total floor reaction force in a narrow sense indicates the components of force and moment of the desired total floor reaction force in the broad sense, when its point of action is set at the desire total floor reaction force central point. The desired total floor reaction force that the desired working pattern generator outputs is the desired total floor reaction force in the narrow sense.

In the following, the desired total floor reaction force indicates, if not explained to the contrary, that in the narrow sense. If the robot walks on a flat floor, the desired total floor reaction force central point is, normally, set on the floor.

The concept of the ZMP, proposed by M. Vukobratovic and known hitherto in the field of robot locomotion control, is used in this specification in an expanded meaning. To be more specific, in case that the resultant force of the inertial force, the gravity and the object reaction force generated by the motion of the robot 1 is expressed by force and moment of force, a floor point (at which the components of the moment about the X-axis and Y-axis are both zero) is called the ZMP, using this floor point as the point of action. The ZMP when the robot 1 performs the desired motion is called a "desired ZMP" and a position thereof is called a "desired ZMP position".

To say that the desired working pattern satisfies the dynamic equilibrium condition indicates that the aforesaid resultant force of the inertial force, the gravity and the object reaction force generated by the desired working pattern is canceled by the desired total floor reaction force and the both become zero. In order to satisfy the dynamic equilibrium condition, accordingly, the desired total floor reaction force central point (position) and the desired ZMP (position) should be the same.

The desired working pattern generator 100 generates the desired working pattern including a gait that satisfies the dynamic equilibrium condition, if a macroscopic stabilization controller (explained below) is not operating. That is to say, in this case, the desired total floor reaction force central point (position) generated by the desired working pattern generator 100 is equal to the desired ZMP (position).

The desired foot position/posture, the desired body position/posture and the desired hand position/posture indicate corresponding positions and postures expressed in the aforesaid supporting leg coordinate system. Specifically, the position and velocity of the body 3 indicate a representative point such as the center of gravity of the body 3 and the (displacement) velocity of that point. Moreover, the postures of the body 3 and foot 22R(L) indicate the orientation or direction of the body and foot in the space of X, Y, Z.

Next, the leg main controller 102 will be explained. The leg main controller 102 functions, briefly speaking, to implement posture tracking control such that the robot follows the desired posture and, simultaneously to implement floor reaction force control such that the robot follows the resultant force of the desired total floor reaction force and a compensating total floor reaction force's moment (explained below), by manipulating the leg actuators (electric motors 10R(L), etc.). Since it is impossible to completely satisfy both the resultant force (of the desired floor reaction force and compensating total floor reaction force's moment) and the desired posture at the same time, the control is appropriately arranged such that the both are eventually satisfied over a long period of time.

More specifically, the leg main controller 102 inputs a corrected desired body position/posture (explained below), the desired foot position/posture, the desired total floor reaction force central point (position), the desired total floor reaction force (that acts about the desired total floor reaction force central point) and the compensating total floor reaction force's moment, and corrects the desired foot position/posture such that the moment components of the actual total floor reaction force acting about the desired total floor reaction force central point (position) is equal to the sum of the desired total floor reaction force's moment (normally zero) and the compensating total floor reaction force's moment. The desired foot position/posture corrected in this manner is called the "corrected desired foot position/posture".

The leg main controller 102 controls the leg actuators 90 by outputting the actuator displacement commands such that actual joint displacements follow desired leg joint displacements determined by the corrected desired body position/posture and the corrected desired foot position/posture.

For implementing the above functions, in this embodiment, the aforesaid technique proposed in Japanese Laid-Open Patent Application No. Hei 10 (1998)-277969 (hereinafter referred to as "composite compliance control") is applied. The element or component that implements the composite compliance control includes, in addition to the leg main controller, the force sensor 56 disposed at each foot 22R(L), actuator drivers 88 and actuators 90.

Figure 8:
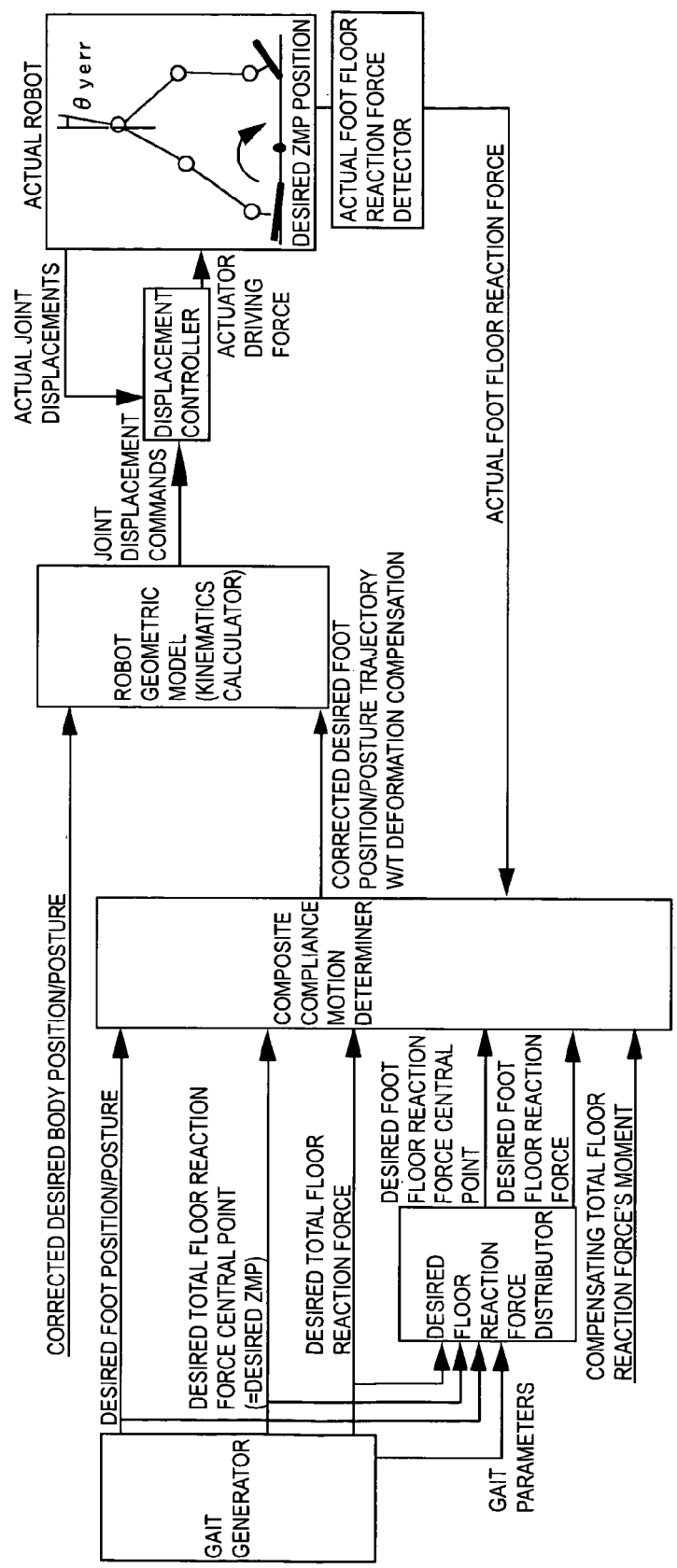
FIG. 8 is a block diagram showing the configuration of a composite compliance controller applied to a leg main controller.

FIG. 8 is a block diagram showing this composite compliance controller. Since the controller is described in the aforesaid Japanese Laid-Open Patent Application No. Hei 10 (1998)-277969, the detailed explanation is omitted. In the composite compliance controller illustrated in FIG. 8, compared with that described in the Japanese Laid-Open Patent Application No. Hei 10 (1998)-277969, a posture stability control in body inclination feedback system (calculation of the compensating total floor reaction force's moment) is omitted.

This is because a similar processing is implemented in a posture stabilization main controller (explained below), and the compensating total floor reaction force's moment calculated there is inputted. However, in order to suppress fluctuation in the floor reaction force due to a body inclination error, the body inclination feedback system may be added.

It should be noted that, in this embodiment, the aforesaid technique proposed in Japanese Patent No. 3269852 (hereinafter referred to as the "macroscopic stabilization control") must be added to the composite compliance control. However, since the body position or stride is corrected, more specifically, the aforesaid corrected desired body position/posture is further corrected in the macroscopic stabilization control, when controlling the motion of the arm links 5 as will be explained below, the influence of the corrected body position or stride must be taken into account, if the relative positional relationship between the hand 40R(L) and the object is significant. When the macroscopic stabilization control is operative, the desired ZMP in the desired working pattern is controlled to a point intentionally deviated from the desired total floor reaction force central point.

Since the corrected desired body position/posture is further corrected due to the addition of the macroscopic stabilization control, the corrected desired body position/posture, finally obtained, is called a "finally-corrected desired body position/posture" as shown in FIG. 5. It should be noted that to add the macroscopic stabilization control is not indispensable in the present invention. In other words, the macroscopic stabilization control may be omitted, and in that case, it suffices if the corrected desired body position/posture is regarded as the finally-corrected desired body position/posture.

In FIG. 5, the finally-corrected desired foot position/posture corrected in the leg main controller 102 is inputted to the posture stabilization main controller 106. Notably, if change in the center of gravity of the robot due to correction of the desired foot position/posture can be neglected, it is not necessary to input the finally-corrected desired foot position/posture to the posture stabilization main controller 106.

Next, the arm main controller 104 will be explained. Outlining the function of the arm main controller 104, it implements the posture control such that the arm links follow the desired posture, and simultaneously implements object reaction force control such that the arm links follow a corrected desired object reaction force (explained below), by manipulating the arm actuators (the electric motors 30R(L), etc.) 92. Here, the term "posture" indicates a combination or set of displacements of all the joints of the arm links 5). Since, however, it is impossible to completely satisfy both the desired posture and corrected desired object reaction force at the same time, an appropriate known technique relating to a manipulator compliance control, such as the so-called "virtual compliance control" (JSME Mechanical Engineer's Handbook; Engineering, C4, page 100), is used.

Explaining the configuration and the algorithm of the control system more concretely, the arm main control system comprises, in addition to the arm main controller 104, the force sensor 58 provided at each hand 40R(L), the actuator drivers 88 and the arm actuators 92.

The arm main controller 104 inputs a final desired body position/posture (or the corrected desired body position/posture), the desired hand position/posture and the corrected desired object reaction force, and corrects the desired hand position/posture in response to the difference between the actual object reaction force detected by the force sensor 58 and the corrected desired object reaction force. The desired hand position/posture, thus corrected, is called a "finally-corrected desired hand position/posture". And the arm main controller 104 controls the arm actuators 92 such that actual joint displacements follow desired arm joint displacements determined by the finally-corrected desired body position/posture (or the corrected desired body position/posture) and the finally-corrected desired hand position/posture.

Next, the posture stabilization main controller 106 will be explained. The posture stabilization main controller 106 implements control, while taking the dynamic equilibrium condition into account, in such a manner that the dynamic balance or posture balance is satisfied. Before entering into the explanation of the controller, the dynamic equilibrium condition will be explained in the following.

The most dominant factor that determines posture inclination behavior of the robot 1 is the balance of moments of the actual force about the desired total floor reaction force central point (i.e., the desired ZMP).

The moments of force acting about the desired total floor reaction force central point can be listed up as follows.

1) the moment of inertial force
2) the moment of gravity
3) the moment of total floor reaction force
4) the moment of object reaction force The moment of inertial force is a moment generated by the change in angular momentum of the robot about the desired total floor reaction force central point. The moment can be calculated using Eulerian equation, and more specifically, is a value obtained by calculating the first differential of angular momentum of the robot 1 about the desired total floor reaction force central point and then by reversing the sign of the calculated value. The moment of inertial force of the desired working pattern is called a "desired moment of inertial force". The moment of inertial force actually generated when the robot 1 works is called an "actual moment of inertial force". The moment of gravity is a moment generated by the gravity (which acts on the center of gravity of the robot 1) about the desired total floor reaction force central point.

The resultant force of the floor reaction forces respectively acting on the two feet 22R(L) is defined as the "total floor reaction force". The moment of total floor reaction force is a moment generated by the total floor reaction force acting about the desired total floor reaction force central point.

As stated above, the reaction force that the hand 40R(L) receives from the object is the "object reaction force". The moment of the object reaction force is a moment generated by the object reaction force acing about the desired total floor reaction force central point.

Here, assuming that the robot 1 follows faithfully a motion pattern of the desired working pattern with the aid of an ideal leg main controller, the actual moment of inertial force will be equal to the desired moment of inertial force, and the actual moment of gravity will be equal to the desired moment of gravity.

On the other hand, according to the law of dynamics (Eulerian equation), the sum of the actual moment of inertial force, actual moment of gravity, actual moment of total floor reaction force and actual moment of object reaction force is always zero.

Therefore, in order that the robot 1 follows faithfully the motion pattern of the desired working pattern, the sum of the desired moment of inertial force, desired moment of gravity, actual moment of total floor reaction force and actual moment of object reaction force must be zero. This is Condition 1.

Figure 9:
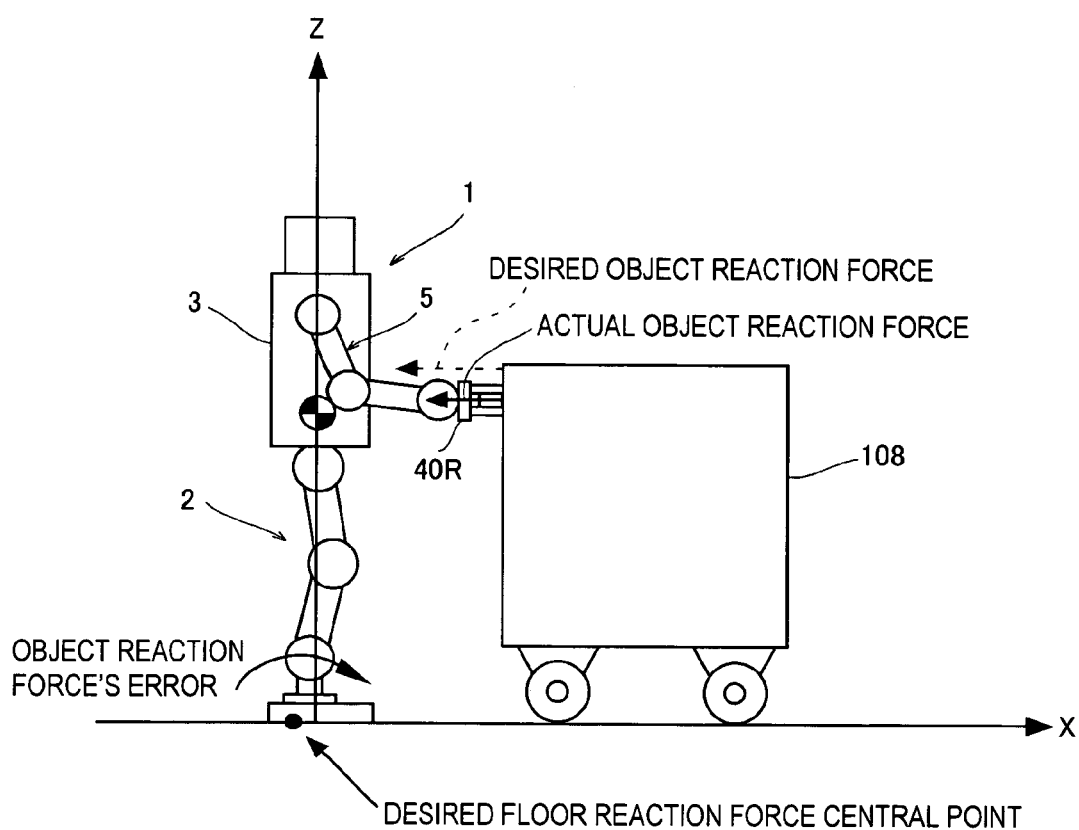
FIG. 9 is an explanatory view showing a principle on which the system illustrated in FIG. 5 is premised.

In fact, however, the actual moment of object reaction force is not equal to the desired moment of object reaction force, producing a difference or error therebetween. This is a situation that, for example, as illustrated in FIG. 9, when the robot pushes a truck (object) 108, the absolute value of the actual rolling frictional force of the truck 108 falls suddenly below an expected value.

In such a situation, the moment generated by the actual object reaction force acting about the Y-axis of the desired total floor reaction force central point, exceeds the moment generated by the desired object reaction force acting about the Y-axis of the desired total floor reaction force central point in the positive direction, thereby failing to satisfy Condition 1 and cause the robot 1 to tilt forward. It should be noted that the direction of moment is defined in such a manner that the moment which moves the robot 1 clockwise in the positive direction on the coordinate axis, is positive.

In order to satisfy Condition 1 even under such a situation, there are proposed two methods in the technique proposed earlier.

Method 1) to vary the actual moment of total floor reaction force so as to cancel out the aforesaid difference or error. Specifically, the leg main controller 102 is instructed to generate a negative moment of floor reaction force about the desired total floor reaction force central point. The leg main controller 102 produces the actuator displacement commands, in response to the instruction, to move the toes of the feet 22R(L) downward so as to increase the actual moment of total floor reaction force in the negative direction, in other words, to control the robot to take a posture to brace leg links 2.

Method 2) to correct the desired moment of inertial force and the desired moment of gravity by correcting the motion pattern of the desired working pattern so as to cancel out the aforesaid difference or error. Specifically, the desired moment of inertial force and the desired moment of gravity are corrected through the correction of the desired body position/posture. More specifically, the body 3 is controlled to move backward and forward.

Since the actual moment of total floor reaction force can be varied quickly through the leg main controller by only changing the desired moment of total floor reaction force, Method 1) is suitable for quick response. However, if the actual moment of total floor reaction force is varied greatly, the contact-pressure distribution on the soles of feet 22R(L)

will be partial and the contactability with the floor will decrease. With this, at the worst, a portion or part of the foot 22R(L) will be lifted. Therefore, the desired moment of total floor reaction force should preferably be returned to its original value over a long period of time.

In order to return the actual moment of total floor reaction force to an original value of the desired moment of total floor reaction force, it suffices if the motion pattern of the desired working pattern is corrected using Method 2) such that the position of center of gravity is displaced (in this case, displaced backward) to cancel out the aforesaid difference or error by the desired moment of gravity. The position of center of gravity should preferably be displaced gradually, since, if the position of center of gravity is displaced sharply, that would generate an excessive desired moment of inertial force in the opposite direction. Thus, Method 2) is suitable in coping with the situation over a long period of time.

In the aforesaid prior art, Japanese Laid-Open Patent Application No. Hei 10 (1998)-230485 proposed by the applicant, both the two methods are used simultaneously. Specifically, Method 1) is mainly used in a short period of time so as to cope with a rapid change, while Method 2) is mainly used over a long period of time so as to converge the actual moment of total floor reaction force to the original value of the desired moment of total floor reaction force.

In the posture control system according to the present invention, it is further added with another method that deliberately changes a constraint direction component of components of the actual object reaction force (Method 3).

The principle of Method 3) will be explained in the following. First, for ease of understanding, it is assumed that a legged mobile robot with a single arm link is controlled to work on an object using a hand provided at the distal end of the arm link. It is also assumed that the hand receives a constraint force from the object to perform a constraint motion.

If the object is supported in the air by the hand and is not supported by anything else, the motion of the hand is imparted with six degrees of freedom in total, (three degrees of freedom in three-dimensional parallel translation and three degrees of freedom in three-dimensional rotation), and the hand does not receive any constraint force from the object.

Contrary, if the object is supported by the hand and another element, the motion of the hand may be subject to the constraint force from the element other than the hand, depending on the situation. Specifically, when the hand contacts the object, e.g., a fixed and highly rigid surface of the object, the hand can not be controlled to penetrate the surface and accordingly, a positional constraint force will naturally arise. In other words, the hand receives the constraint force from the object surface. Noticing this constraint force, the posture control system according to the present invention is arranged to implement the posture stability control of the robot using the constraint force.

Before continuing the explanation, the coordinate system and various spaces and directions used in the later explanation will be defined as follows. It should be noted that variables described in the following are expressed in the supporting leg coordinate system, unless otherwise noted.

Further, velocity components of the hand in the X, Y and Z directions at a certain moment are indicated by Vx, Vy and Vz, respectively. Similarly, rotational velocity components about the X-, Y- and Z-axes at the same moment are indicated by $\omega x$, $\omega y$ and $\omega z$, respectively. As regards the rotation, the direction of rotation in clockwise in the positive direction on the coordinate axis, is defined as positive.

Velocity of the hand at this moment should be expressed by a vector (Vx, Vy, Vz, $\omega x$, $\omega y$, $\omega z$) and it is called a "hand velocity vector".

Further, a set of the hand velocity vectors (Vx, Vy, Vz, $\omega x$, $\omega y$, $\omega z$) whose components comprise given real numbers Vx, Vy, Vz, $\omega x$, $\omega y$ and $\omega z$ is called a "total motion velocity space". The total motion velocity space is a so-called vector space.

Also, a set of all hand velocity vectors that can not be realized at a certain moment is called a "constraint velocity area" at that moment. Here, the set of hand velocity vectors (that can not be realized) are judged from a standpoint of geometry. More precisely, the hand velocity vectors that generate stress at that moment, without causing the hand to displace, due to interference between the hand and the object, are defined as the hand velocity vectors that can not be realized. Here, constraints, due to location of the arm actuators or the arm joints, are not taken into account.

That is to say, it is premised that the hand itself can move in a given velocity if the object does not exist. Further, if the hand and the object have sufficient rigidity, they are regarded as rigid bodies. Consequently, when a given hand velocity vector (Vx1, Vy1, Vz1, $\omega x1$, $\omega y2$, $\omega z1$) is the element of the constraint velocity area, the product obtained by multiplying by a positive given real number k, i.e., (kVx1, kVy1, kVz1, k$\omega x1$, k$\omega y1$, k$\omega z1$) is also regarded as an element of the constraint velocity area. For convenience, a zero vector (0, 0, 0, 0, 0, 0) is also regarded as an element of the constraint velocity area.

Notably, the constraint velocity area should not be confused with a velocity area comprised of the hand velocity vector that can be realized under the constraint condition. Besides, the constraint velocity area is not always limited to the so-called vector space. For instance, if the hand grasps a sufficiently rigid object placed on a floor, the hand can not move just below (the lower side in a normal direction of the floor), but can move in the opposite direction (the upper side in the normal direction).

In other words, the hand velocity vectors in the just-below direction are the elements of the constraint velocity area, whilst those in the opposite direction are not the elements of the constraint velocity area. Assuming that the constraint velocity area is equal to the vector space, with respect to a given element in the constraint velocity area (Vx1, Vy1, Vz1, $\omega x1$, $\omega y1$, $\omega z1$), its inverse vector, i.e., (-Vx1, -Vy1, -Vz1, -$\omega x1$, -$\omega y1$, -$\omega z1$) must be the element of the constraint velocity area. However, since the constraint velocity area in this case does not satisfy this condition, the constraint velocity area is not the vector space.

Next, a constraint velocity space is defined as follows. Specifically, a set of vectors (Vx1, Vy1, Vz1, $\omega x1$, $\omega y1$, $\omega z1$) defining the constraint velocity area and the inverse vectors thereof (-Vx1, -Vy1, -Vz1, -$\omega x1$, -$\omega y1$, -$\omega z1$) are defined as the constraint velocity space. Normally, the constraint velocity space is a partial vector space of the total motion velocity space.

Among vectors in the total motion velocity space, a set of all the vectors whose inner products with a given vector in the constraint velocity area are zero (i.e., those orthogonal to the given vector), is called a "free velocity space".

Here, the vectors in the constraint velocity space and free velocity space are defined as follows. A direction vector that is the element of the constraint velocity space is called a "constraint direction vector". When simply named as a "constraint direction", it means the direction of a given constraint direction vector. A direction vector that is the element of the free velocity space is called a "free direction vector". When simply named as a "free direction", it means the direction of a given free direction vector.

The constraint velocity spaces with respect to works on several objects will be described in the following.

Work 1) lifting an object in the air by hand.

In this case, the constraint velocity space does not exist. It is promised, for convenience, that the constraint velocity space is solely made up of a zero vector. The free velocity space is equal to the total motion velocity space.

Work 2) grasping and pushing the truck 108 with universal caster wheels by the hand 40R, as shown in FIG. 9 and described above.

In this case, the constraint velocity space comprises a set of hand velocity vectors (0, 0, Vz, ωx, ωy, 0) that include given real numbers Vz, ωx and ωy.

Figure 10:
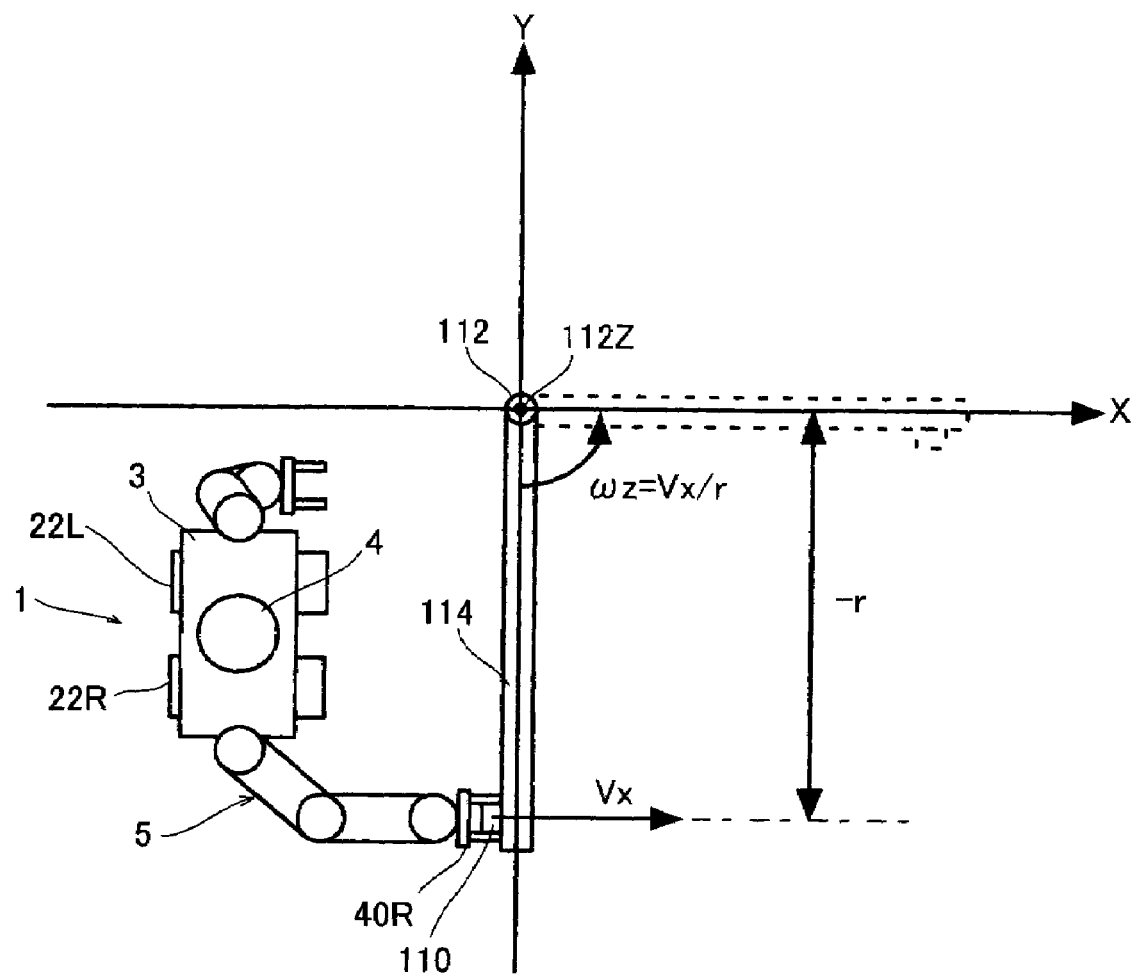
FIG. 10 is an explanatory view, similar to FIG. 9, and also showing the principle on which the system illustrated in FIG. 5 is premised.

Work 3) opening/closing a door 114 with a hinge 112, while grasping a knob 110 by the hand 40R, as shown in FIG. 10.

In this case, motions other than rotation about a hinge axis 112Z are constrained. Defining the hinge axis as Z-axis, X-coordinate of the hand at that moment as 0 and Y-coordinate of the same as −r (r: the radius of rotation of the door 114, more specifically, the radius of rotation of the knob 110), the free velocity space is constituted by a set of hand velocity vectors (Vx, 0, 0, 0, 0, Vx/r) that have a given real number Vx.

Also, the constraint velocity space is constituted by a set of hand velocity vectors (Vx, Vy, Vz, ωx, ωy, −r*Vx) that have given real numbers Vx, Vy, Vz, ωx and ωy.

Figure 11:
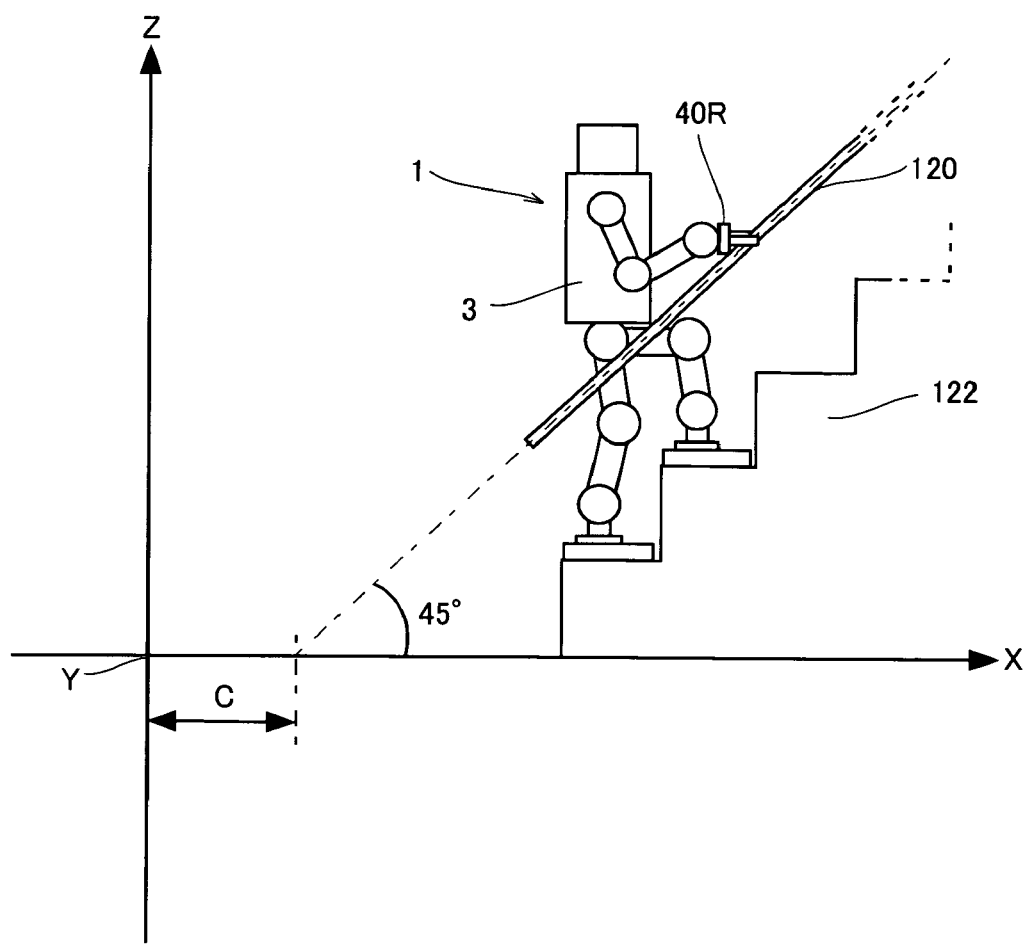
FIG. 11 is an explanatory view, similar to FIG. 9, and also showing the principle on which the system illustrated in FIG. 5 is premised.

Work 4) ascending/descending stairs 122, while sliding the hand 40R along a cylindrical handrail 120 under the environment illustrated in FIG. 11.

In this case, motions other than a parallel translation along the longitudinal axis of the handrail 120 and rotation about that axis of the handrail 120 are constrained. Expressing the axis of the handrail 120 by equations x=z+c, y=−d (c, d: constants), the free velocity space comprises hand velocity vectors (Vx, 0, Vx, ωx, 0, ωx) that have given real numbers Vx and ωx. The constraint velocity space comprises a set of hand velocity vectors (Vx, Vy, −Vx, ωx, ωy, −ωx) that have given real numbers Vx, Vy, ωx and ωy. For ease of understanding, the handrail 120 is assumed to cross with the X-axis at an angle of 45 degrees.

Work 5) ascending/descending the stairs 122, while grasping the handrail 120 by the hand 40R firmly in the environment illustrated in FIG. 11.

When the handrail 120 is grasped firmly, the motions have no freedom and all motions are constrained. Accordingly, the constraint velocity space is equal to the total motion velocity space.

In the works mentioned above, when a force is imparted to the object from the hand in its constraint direction, if only the constraint force to cancel out the force is generated at the object from an element other than the hand and if no friction is substantially generated in free directions, the motions of the hand and the object will not change.

Taking Work 3 (FIG. 10) as an example, when the hand 40R is operated to generate an upward force (upward force in Z-axis) on the door 114, if friction of the hinge 112 is substantively zero, since only the force to cancel out the aforesaid upward force acts from the hinge 112 to the door 114, this does not influence upon the rotational motion of the door 114.

The posture control system according to the present invention utilizes this understanding and is arranged to stabilize the robot posture without interfering with the motion control of the object. Specifically, the system is configured such that the dynamic balance is maintained or an inclined posture of the robot is restored without giving an influence on the motion of the object, by controlling the constraint direction components of force that acts on the hand from the object.

The effects of this control will be explained in the following taking Work 3 as an example. Assume a situation that, when the robot 1 stands in front of the door 114 to open/close it, the robot 1 is about to tilt forward. One method to restore the posture of the robot 1 is to push the door 114 forward. With this, the robot 1 can receive the reaction force from the door 114 and its posture recovers.

However, if the door 114 must be pushed for the posture stabilization control, the door 114 will be accelerated and the motion thereof is deviated from the desired opening/closing motion. Therefore, the excessive restoring force should not be generated. In particular, if the mass of the door is quite smaller than that of the robot 1, it is almost impossible to generate the restoring force. In addition, since the motion of the door 114 is changed from the predetermined pattern, it is not preferable from the standpoint of implementation of the work.

Another method to restore the posture of the robot 1 is to push the door 114 downward. With this, the robot 1 can receive the reaction force from the door 114 and can recover the posture. Further, since the door is only pushed in the constraint direction, the motion remains unchanged as mentioned above.

Since the posture control system according to the present invention utilizes the latter method, the fact that some constraint direction must exist in the motion of the hand as in the foregoing Works 2, 3 and 4 is a required condition for applying the present invention. Accordingly, the present invention is not applicable to the Work 1.

It should be noted that a cylindrical coordinate system or a polar coordinate system can be used as a coordinate system expressing the constraint velocity space or the like. It is because any normal coordinate systems can be transformed with each other and the space indicated by the constraint velocity space is same at the moment of transformation. To set or select an appropriate coordinate system depending on the work may occasionally make the constraint velocity space kept constant (universal) when the work is being implemented. For instance, in the Work 3, by using the cylindrical coordinate system such that the axis of the hinge 112 is made identical to the axis of the cylindrical coordinate system, the constraint velocity space at each moment can be kept constant.

Next, the case that a robot having a number "n" of arm(s) is controlled to work will be discussed. Here, definitions of each spaces or directions are expanded as follows.

First, each hand is assigned with an identification number from 1 to n, as shown in the equation below, and called "the j-th hand" (j=1, 2, . . . , n) to be discriminated.

The aforesaid supporting leg coordinate system is to be used as a coordinate system. The respective velocity components in the X, Y and Z directions of the j-th hand at a certain moment are indicated by Vxj, Vyj and Vzj. Similarly, the rotational velocity components about the X-, Y- and Z-axes at the same moment are indicated by ωxj, ωyj and ωzj, respectively.

A vector (Vx1, Vy1, Vz1, ωx1, ωy1, ωz1, Vx2, Vy2, Vz2, ωx2, ωy2, ωz2, . . . , Vxn, Vyn, Vzn, ωxn, ωyn, ωzn) is called a "total hand velocity vector". The vector is made up of a component of the hand velocity vectors each arranged from the 1st hand to the n-th hand in order. It should be noted that, instead of the vector expression, a matrix with n row(s) and 6 columns whose j-th column is the velocity vector of the j-th hand may be used.

From here onward, the total hand velocity vectors are renamed as "hand velocity vectors" and a set of the hand velocity vectors whose components are given real numbers is renamed as a "total motion velocity space". This total motion velocity space comprises a 6*n-dimension vector space.

Further, the set of all the hand velocity vectors that can not be realized at a certain moment are renamed as a "constraint velocity area" at that moment. The hand velocity vector that can not be realized is discriminated from the standpoint of geometry. In other words, the hand velocity vector that can generate stress at that moment, with causing almost no hand displacement to happen, due to interference between the hand and the object or that between the hand and another hand, is defined as the hand velocity vector that can not be realized.

At this situation, a restriction due to location of the arm actuators or the joints of the arm links 5 or the like is not taken into account. In other words, it is based on the premise that the hand itself can move as desired unless the object exists. Further, if the hand or object has sufficient rigidity, they are regarded as rigid bodies. Accordingly, if a velocity vector is the component vector constituting the constraint velocity area, the vector obtained by multiplying all the components of that velocity vector by k (k: given positive real number) is also regarded as the vector that constitutes the constraint velocity area. For convenience, a zero vector is also regarded as the vector that constitutes the constraint velocity area.

A set of given vectors constituting the constraint velocity area thereof and inverse vectors (vectors with the same magnitude, but the direction is opposite) is renamed as a "constraint velocity space". Normally, the constraint velocity space comprises a partial vector space of the total motion velocity space.

Among vectors in the total motion velocity space, a set of all the vectors whose inner products with a given vector is zero (i.e., orthogonal to the given vector), is renamed as a "free velocity space".

Here, the vectors constituting the constraint velocity space and the free velocity space are defined as follows. A direction vector constituting the constraint velocity space is renamed as a "constraint direction vector". When simply saying as the constraint direction, it means the direction of a given constraint direction vector. A direction vector constituting free velocity space is renamed as a "free direction vector". When simply saying as the free direction, it means the direction of a given free direction vector.

The definitions relating to the motion degree of freedom and constraint of the object(s) and the hand are expanded as stated above. With this, when the robot having a plurality of hands performs a work by using the plural hands, by operating all the hands to move in the constraint direction to receive the reaction force (constraint force) from the object(s), it becomes possible to maintain the dynamic balance of the robot or restore an inclined posture thereof, without giving an influence on the motion of the object(s).

Figure 12:
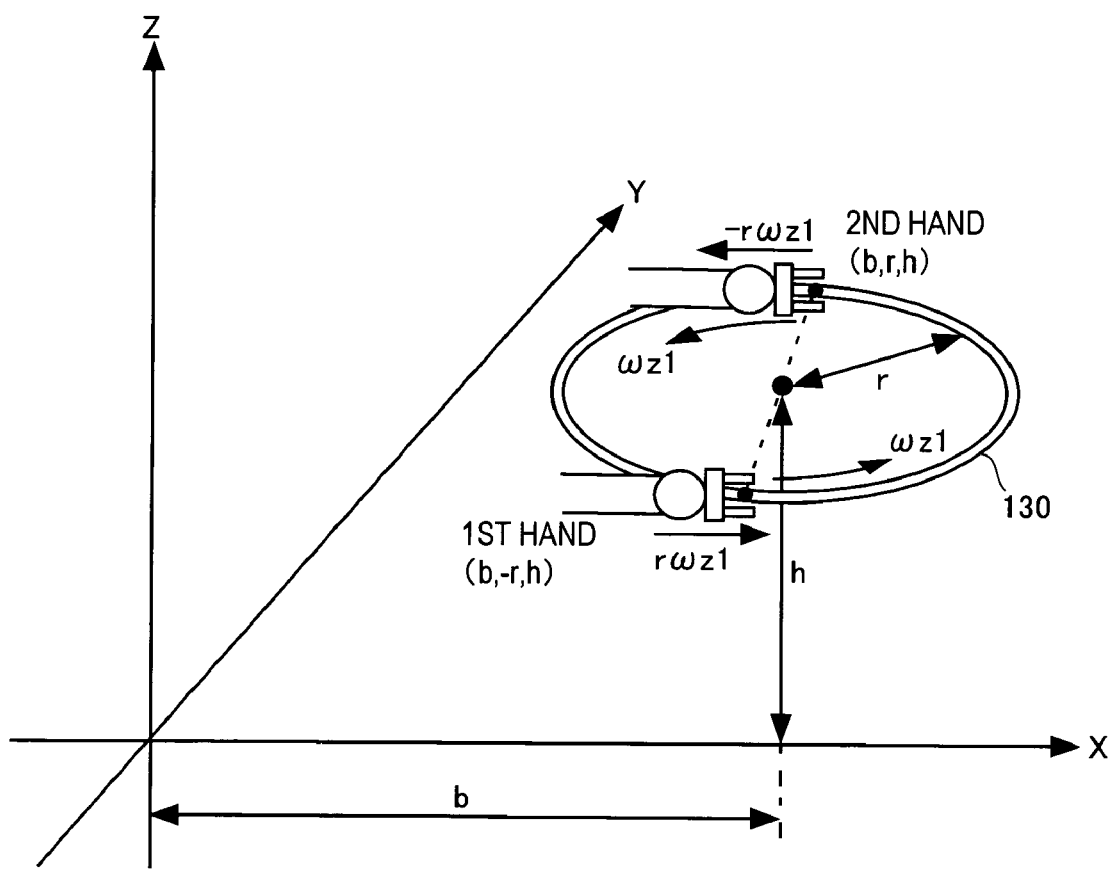
FIG. 12 is an explanatory view, similar to FIG. 9, and also showing the principle on which the system illustrated in FIG. 5 is premised.

An example of work with the use of a plurality of hands will be described in the following. As illustrated in FIG. 12, assume that the object is a round wheel 130 that has a height h and a radius r and is rotatable about Z-axis located at the front b. The work is to grasp the wheel 130 by two hands comprising a first hand and second hand and to rotate it.

It is assumed here that the coordinates of the first hand are (b, −r, h) and those of the second hand are (b, r, h) at a certain moment. The free velocity space at that moment is constituted by a set of hand velocity vectors with a given real number $\omega z1$, i.e., $(r^*\omega z1, 0, 0, 0, 0, \omega z1, -r^*\omega z1, 0, 0, 0, 0, \omega z1)$. This means a motion to rotate the two hands about an axis of the object by the same degrees.

The constraint velocity space at that moment comprises a set of hand velocity vectors with given real numbers $Vx1$, $Vy1$, $Vz1$, $\omega x1$, $\omega y1$, $\omega z1$, $Vx2$, $Vy2$, $Vz2$, $\omega x2$ $\omega y2$, i.e., $(Vx1, Vy1, Vz1, \omega x1, \omega y1, \omega z1, Vx2, Vy2, Vz2, \omega x2 \omega y2, -r^*Vx1-\omega z1+r^*Vx2)$. For instance, the hand velocity vector $(Vx1, 0, 0, 0, 0, 0, Vx1, 0, 0, 0, 0, 0)$ is a velocity vector constituting the constraint velocity space. This indicates that, assuming that friction of the axis of the wheel 130 is zero, if the both hands are operated to push in the X-direction by the same force, the rotational motion of the wheel 130 will not be affected.

Figure 13:
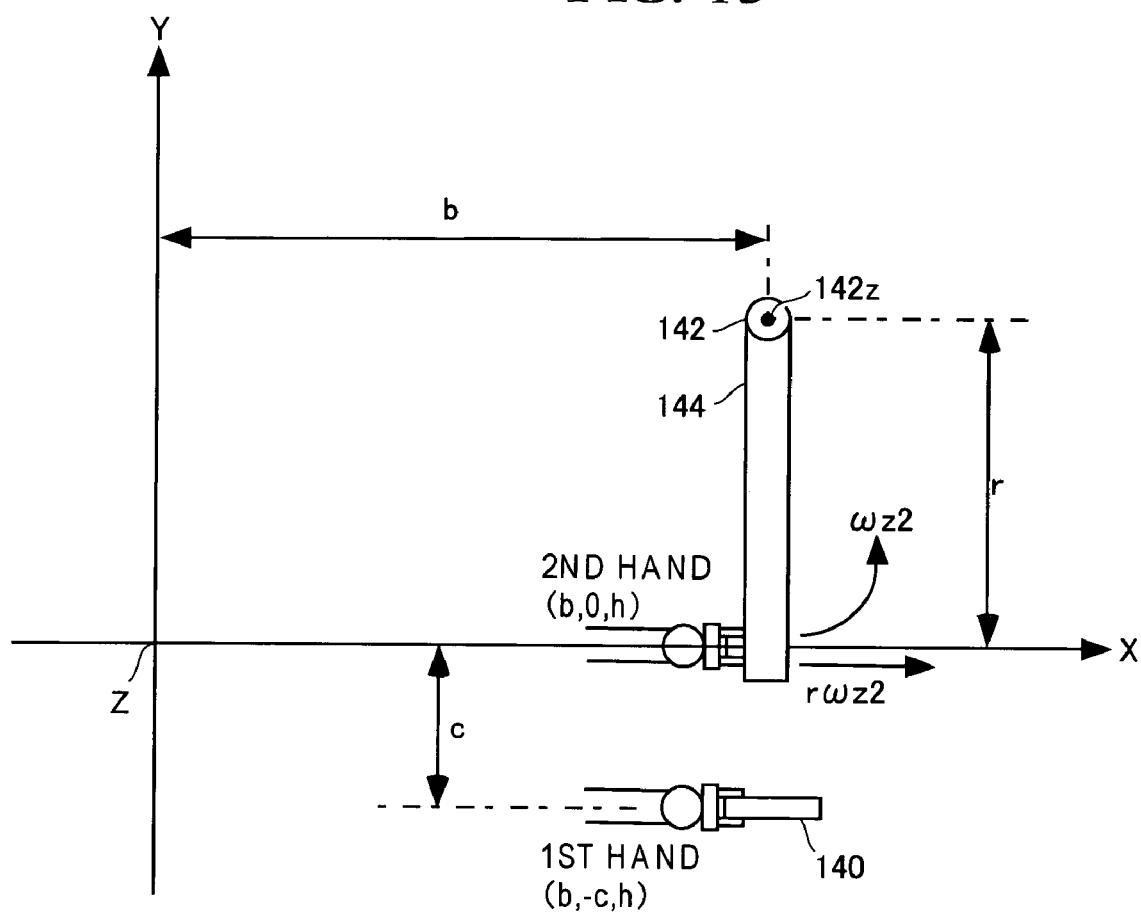
FIG. 13 is an explanatory view, similar to FIG. 9, and also showing the principle on which the system illustrated in FIG. 5 is premised.

Another example will be explained with reference to FIG. 13. As illustrated in the figure, the work is to open/close a door 144 with a hinge 142 by the second hand, while grasping a fixed object (e.g., a column) 140 by the first hand.

Assuming that the direction of the axis 142Z of the hinge 142 is in parallel with the Z-axis, it is defined that X-coordinate of the hinge axis 142Z as b, Y-coordinate of the hinge axis as r and the coordinates of the second hand at that moment as (b, 0, h). Defining the coordinates of the first hand as (b, −c, h), the free velocity space comprises a set of the hand velocity vectors $(0, 0, 0, 0, 0, 0, r^*\omega z2, 0, 0, 0, 0, \omega z2)$ with a given real number $\omega z2$.

Since the constraint velocity space is constituted by a set of vectors that cross orthogonally thereto, it comprise a set of the hand velocity vectors $(Vx1, Vy1, Vz1, \omega x1, \omega y1, \omega z1, Vx2, Vy2, Vz2, \omega x2 \omega y2, -r^*Vx2)$ having real numbers $Vx1$, $Vy1$, $Vz1$, $\omega x1$, $\omega y1$, $\omega z1$, $Vx2$, $Xy2$, $Vz2$, $\omega x2$ $\omega y2$.

For instance, a hand velocity vector $(Vx1, Vy1, Vz1, \omega x1, \omega y1, \omega z1, 0, 0, 0, 0, 0)$ is a velocity vector that constitutes the constraint velocity space. This indicates that the rotational motion of the door 144 is not affected when the first hand is operated to push the fixed object 140 in any manner.

As described above, when a plurality of hands are operated to act forces to the object in the constraint directions, if only the constraint force to cancel out the force is generated at the object from the element (other than the hand) that supports the object and if friction or the like is not generated in the free direction, the motions of the hands and the object do not change.

Accordingly, by expanding the definitions as stated above, in the work using the plural hands, in accordance with the same principle as the work using one hand, it becomes possible to stabilize robot posture without interfering in the motion control of the object. To be more specific, in the work that uses a plurality of hands, by controlling the constraint direction components of force acting on the hands from the object, it becomes possible to maintain the dynamic balance of the robot or to restore an inclined posture thereof, without giving an influence on the motion of the object.

Generally, when the number of hands is plural, e.g., two as illustrated in this embodiment, since the dimension of the constraint velocity space becomes greater than the case of one hand, it becomes possible to obtain higher effects or advantages compared to the case of one hand, by choosing a partial vector space that is effective for stabilizing robot posture and by generating the constraint force in a direction of vectors constituting the space.

When it comes to the foregoing example of the work of opening/closing the door, in order to restore the robot posture without interfering in the opening/closing control of the door, if the robot has a single arm, it will be the most effective manner to generate a force in the upward/downward direction. When the robot has two arms, it becomes possible to maintain the dynamic balance of the robot or restore an inclined posture thereof more effectively, by operating one hand (that does not grasp the door) to push a fixed object.

Making the above principle as a premise, the explanation of the posture stabilization main controller 106, illustrated in FIG. 5, will be continued.

The posture stabilization main controller 106 uses all of the following three methods mentioned above, and is configured as shown in FIG. 14.

1) to correct the actual total floor reaction force's moment;
2) to correct the desired inertial force's moment and desired gravity moment; and
3) to correct the constraint direction component from among components of the actual object reaction force;

Specifically, the posture stabilization main controller 106 comprise a posture stabilization compensating moment calculator 200, an object reaction force equilibrium controller 202, an object reaction force moment error separator 204, a corrected desired object reaction force calculator 206 and various distributors (precisely, an object reaction force equilibrium control distributor 208 and a compensating moment distributor 210).

In all of the respective constituent components of the posture stabilization main controller, calculations are repeated in every control cycle (e.g., in every 100 msec.). When the ECU 62 can not implement calculations simultaneously from its performance, the calculation may be successively implemented from the upstream of arrows in FIG. 14 in order.

Variables and constituent components to be processed or calculated in the posture stabilization main controller 106 will be explained (defined) in the following.

As described above, the posture control system according to the present invention is a system that maintains the dynamic balance of the robot 1 or restores an inclined posture thereof, without giving an influence on the motion of the object, by controlling the constraint direction component of the object reaction force. However, all the constraint direction components of the object reaction force do not necessarily have effects to maintain the dynamic balance of the robot 1 or restore the inclined posture thereof.

There is also a case that the desired object reaction force of a certain constraint direction should not be changed in the light of the purpose of work or the nature of the object. In other words, a component to be used to maintain the dynamic balance of the robot 1 or restore a inclined posture thereof should be selected from among the constraint direction components of the object reaction force, taking into account the degree of effect to restore the posture, the purpose of work and the nature of the object, appropriately.

Figure 24:
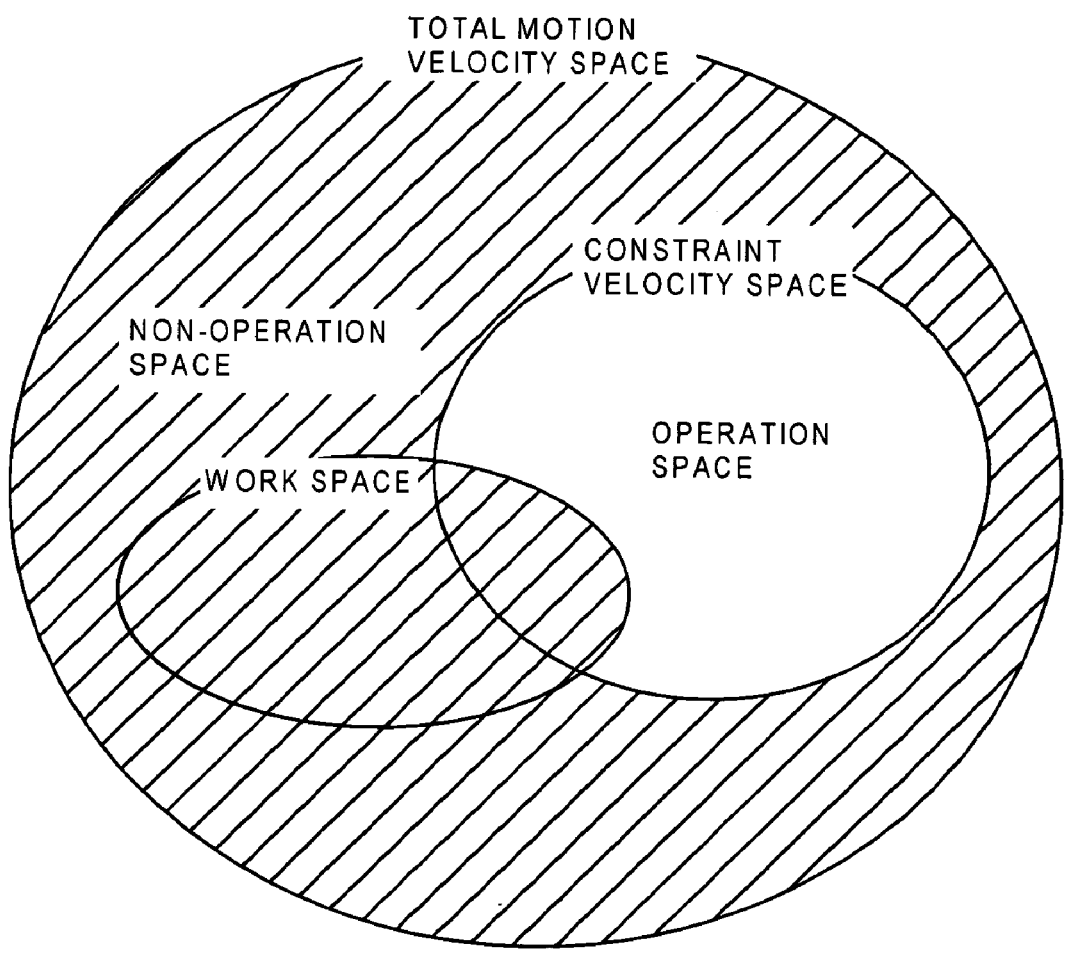
FIG. 24 is an explanatory view showing the operation of the posture stabilization main controller illustrated in FIG. 14.

Therefore, the space and direction are newly defined. Explaining them with reference to FIG. 24, first, in the total motion velocity space, a vector space defined by all constraint directions to be used to maintain the dynamic balance of the robot 1 or restore an inclined posture thereof is called a "operation space". The operation space is a partial vector space of the constraint velocity space. A given direction vector in the operation space is called an "object reaction force operation direction", or simply an "operation direction". As illustrated in the figure, the operation space corresponds to the white-ground part that is the constraint velocity space from which a work space is removed.

Among direction vectors in the total motion velocity space, a vector whose inner product with a given object reaction force operation direction is zero (i.e., orthogonal to that direction), is called an "object reaction force non-operation direction", or simply "non-operation direction" and a space defined by all of the non-operation directions is called a "non-operation space".

Specifically, the non-operation space is a partial vector space of the total motion velocity space, and the free velocity space is a partial vector space of the non-operation space. A given vector in the operation space and that in the non-operation space cross orthogonally with each other.

The operation direction can be considered as one kind of control parameters, like a compliance constant, etc. of the compliance control. This value is not constant, but has a characteristic that changes as a work proceeds. Although it is significant how to determine this value, since it is not essential of the posture control system according to the present invention, for ease of explanation, it is assumed in this embodiment that the operation direction should be determined in advance based on the purpose or pattern of work and the nature or property of the object. It should also be noted that, nevertheless, the operation direction may be determined during working.

Taking the above as a premise, the aforementioned components of the posture stabilization main controller 106 will be explained in detail.

The posture stabilization compensating moment calculator 200 is a device to calculate a posture stabilization compensating moment (moment used for correcting the actual total floor reaction force's moment) that is used to converge a posture inclination error of the robot 1, more specifically, a body inclination error which is the difference between the actual body inclination and a desired body inclination, to zero, and is the configuration to achieve the foregoing Method 1. In response at least to the error between the body inclination angle detected by the inclination sensor 60 and the desired body inclination angle generated by the desired working pattern generator 100, this device calculates the posture stabilization compensating moment to decrease the error.

Figure 15:
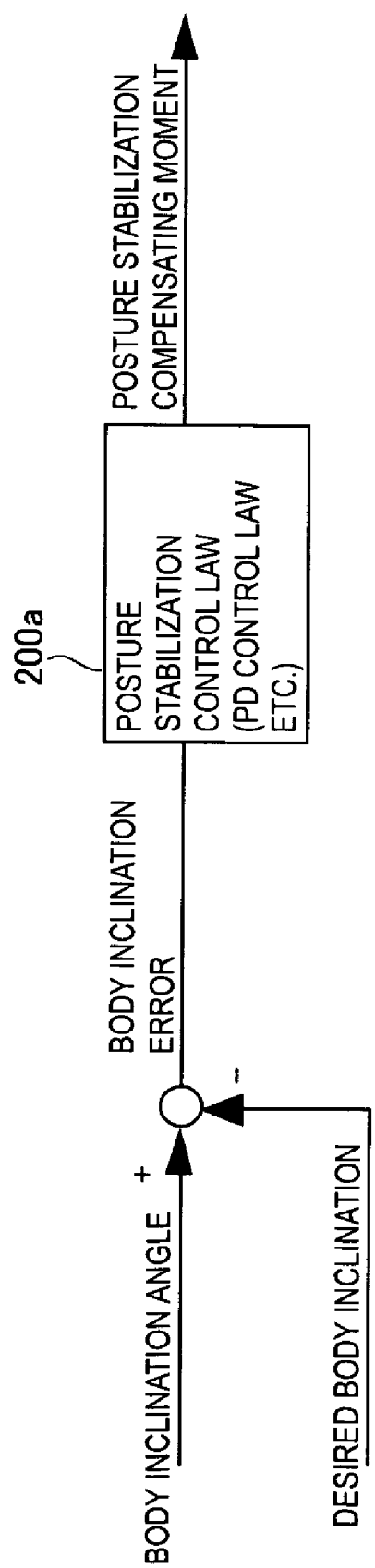
FIG. 15 is a block diagram showing the configuration of a posture stabilization moment calculator of the posture stabilization main controller illustrated in FIG. 14.

The posture stabilization compensating moment calculator 200 is illustrated in the simplest manner in FIG. 15. In the configuration illustrated in the figure, although both inputs and outputs are expressed in terms of scalar quantities in one dimension, in fact, they have X-direction component and Y-direction component and the processing shown in the figure is implemented for each of the components. Since Z-direction component does not contribute to the posture stability, it is omitted here.

Explaining in the following, first, the body inclination error that is the difference between the actual body inclination and the desired body inclination is calculated. Next, a derivative value of the body inclination error is calculated in a posture stabilization control law 200a, and finally, the posture stabilization compensating moment is calculated in accordance with Eq. 1.

$$\text{Posture stabilization compensating moment} = \qquad \text{Eq. 1}$$
$$-kp * \text{Body inclination error} -$$
$$kd * \text{Derivative value of the body inclination error}$$

Here, kp and kd are control gains. H infinity control or the like may also be used.

Figure 14:
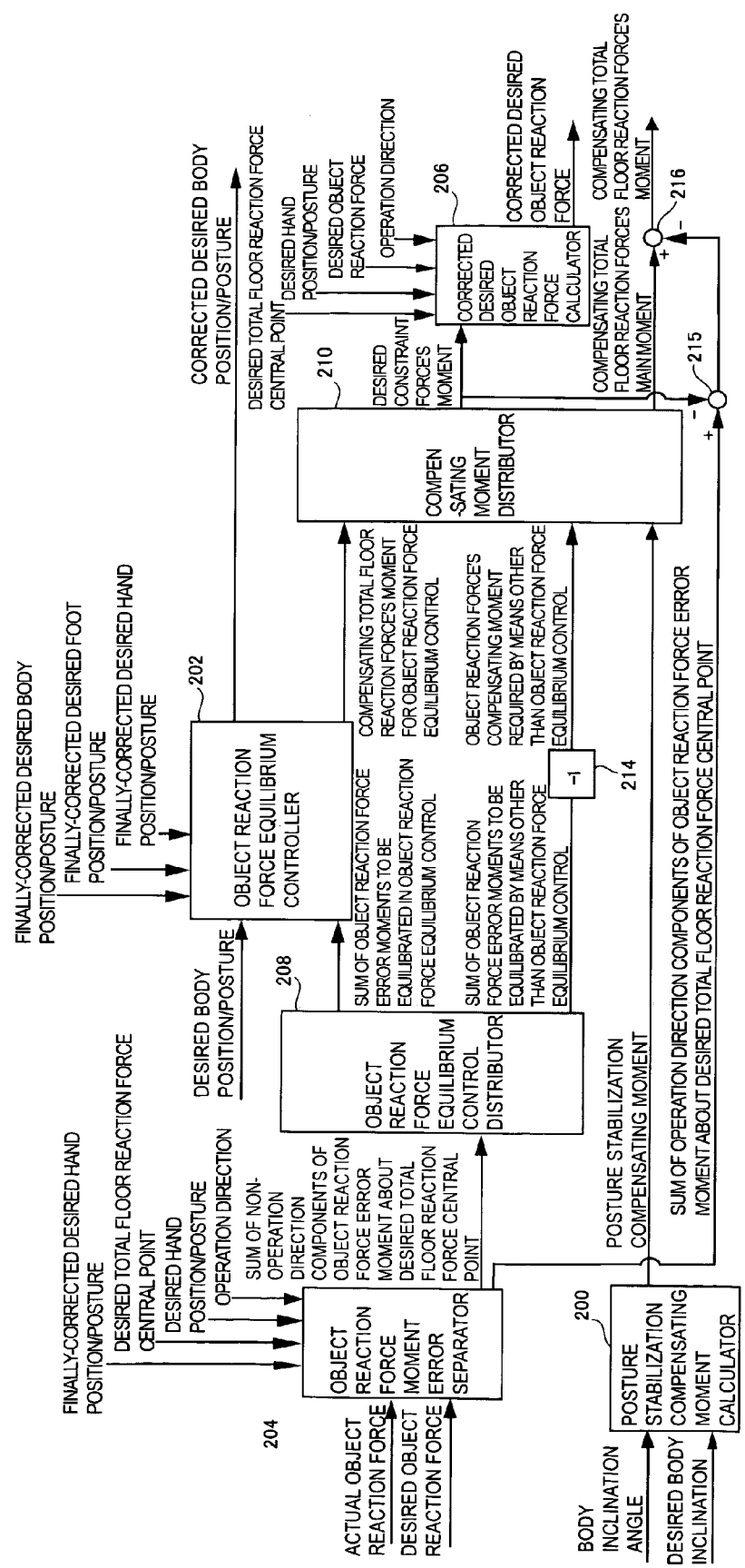
FIG. 14 is a block diagram showing the configuration of a posture stabilization main controller among the systems illustrated in FIG. 5.

Continuing the explanation of FIG. 14, the object reaction force equilibrium controller 202 is a device that, when experienced with a detectable but unexpected object reaction force, by correcting the desired body position/posture taking the object reaction force into account, implements the control to correct a desired inertial force's moment and a desired gravity moment generated in the desired working pattern generator 100 such that dynamic balance is maintained, i.e. is a device that has the configuration to achieve the aforesaid Method 2).

The object reaction force moment error separator 204 is a device that separates the object reaction force into the constraint direction component to be used for posture stabilization and components other than that. The corrected desired object reaction force calculator 206 is a device that calculates the desired object reaction force that is obtained by adding the object reaction force to a desired constraint force necessary for the posture stabilization.

The configuration of the two devices 204 and 206 and added by the various distributors (the object reaction force equilibrium control distributor 208 and the compensating moment distributor 210) is the configuration for achieving the aforesaid Method 3). The details of the devices will be explained later.

Explaining the object reaction force moment error separator 204 first, it is assumed that the actual hand force detected by the force sensor 58 at the hand 40R(L) is a force acting on a reference point of the hand and the force's moment that are expressed by a coordinate system set in the hand locally. Here, the reference point of the hand is a point at the hand set to express the location of the hand 40R(L). Also, the original point of the aforesaid coordinate system set at the hand locally is set to the reference point of the hand.

The hand position/posture indicates a position of the original point and a direction or orientation of the coordinate system when the aforesaid coordinate system set in the hand locally is viewed from the supporting leg coordinate system. More specifically, the position of the original point is expressed by a vector and the direction or orientation of the coordinate system is expressed by a matrix having three rows and three columns. Instead, a homogeneous matrix that expresses the position of the original point and the direction or orientation of the coordinate system collectively, commonly used in the field of robotics, may be used.

Further, since the hand 40R(L) can be considered to be almost at the final corrected desired hand position/posture by being driven by the arm main controller 104 through the actuator displacement commands, the actual hand position/posture can be considered to be almost in the finally-corrected desired hand position/posture, the aforesaid coordinate system set at the hand locally may be regarded as a coordinate system standardized on of the finally-corrected desired hand position/posture.

Figure 16:
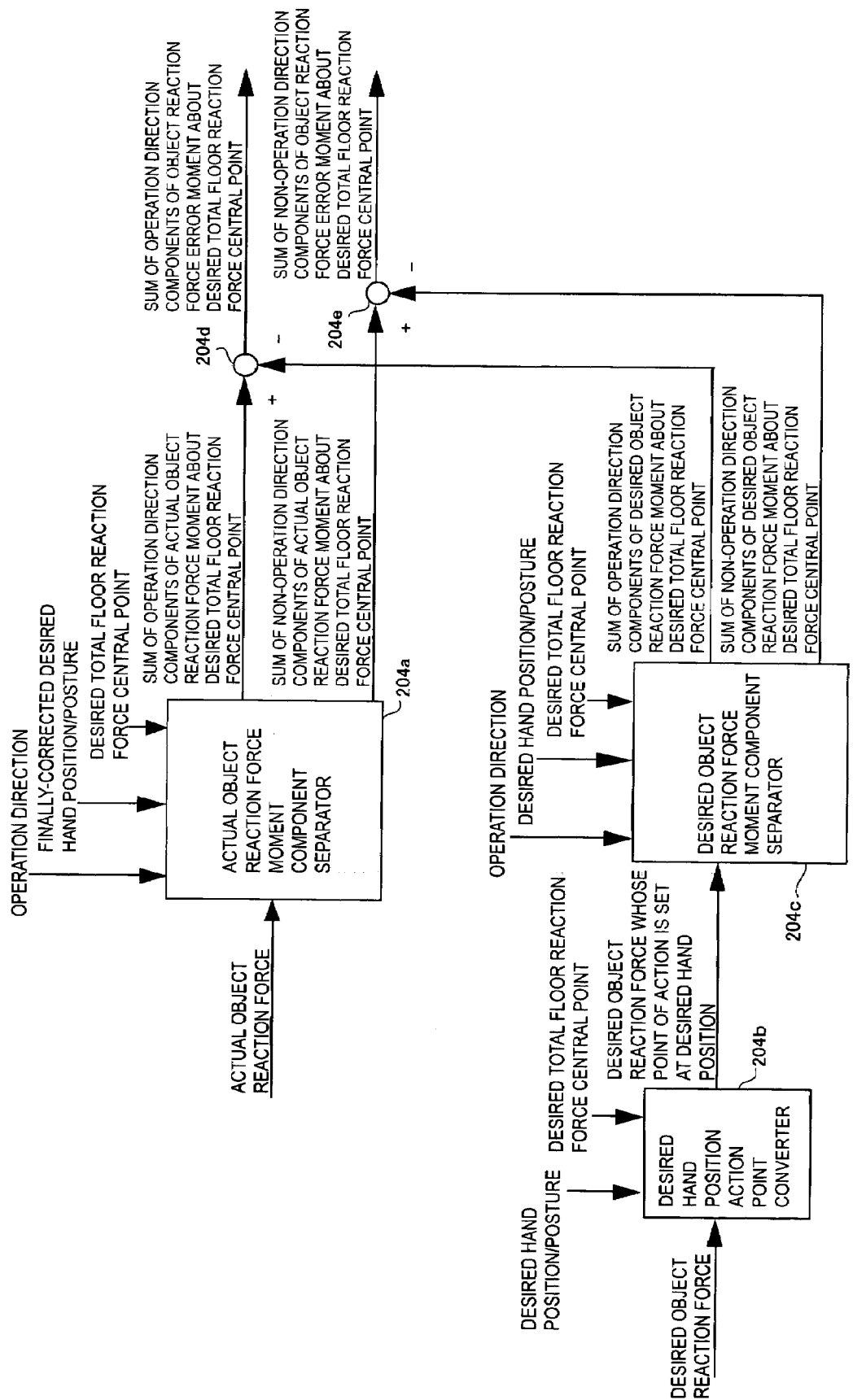
FIG. 16 is a block diagram showing the configuration of an object reaction force moment error separator of the posture stabilization main controller illustrated in FIG. 14.

FIG. 16 is a block diagram showing the configuration of the object reaction force moment error separator 204. Explaining this with reference to the figure, the object reaction force moment error separator 204 has an actual object reaction force moment error separator 204a that inputs the final corrected desired hand position/posture viewed from the supporting leg coordinate system and converts the actual hand force into a value in the supporting leg coordinate system. The actual hand force converted into the value in the supporting leg coordinate system is also expressed by the force and the force's moment acting on the reference point of the hand. Here, what obtained by converting the point of action of the actual hand force (converted into the supporting leg coordinate system) into the total floor reaction force central point is the actual object reaction force. They indicate the same thing, although the expressions are made different.

When n hands are provided, the actual hand force converted into the supporting leg coordinate system is expressed by a vector whose components comprises the actual hand force of each hand arranged in order. In other words, the actual hand force is expressed by a vector in the total motion velocity space.

Specifically, it is expressed as; (F1x, F1y, F1z, M1x, M1y, M1z, F2x, F2y, F2z, M2x, M2y, M2z, ..., Mnz). Here, Fjx, Fjy, Fjz indicate X, Y, Z-components of the force that acts on the reference point of the j-th hand, and Mjx, Mjy, Mjz indicate X, Y, Z-components of the moment of force that acts on the reference point of the j-th hand.

Next, the separator 204a separates the actual hand force (converted into the value in the supporting leg coordinate system) into the operation direction component and the non-operation direction component in accordance with the direction of operation selected in advance. It should be noted here that the respective components are vectors in the total motion velocity space as mentioned above, and are not vectors in the actual three-dimensional space.

Specifically, the separator 204a separates according to the calculation mentioned in the following. First, assuming that the operation space is m-dimensional, orthogonal basic vectors in the operation space are defined as A1, A2, ..., Am, whilst orthogonal basic vectors in the non-operation space are defined as B1, B2, ..., Be. Here, the sum of m and e is six times of the number of the hand.

Next, a vector of the actual hand force converted into the value of the supporting leg coordinate system is defined as F. The operation direction component of the actual hand force is defined as Fa and the non-operation direction component of the actual hand force is defined as Fb. These are vectors in the total motion velocity space.

The operation direction component of the actual hand force Fa and the non-operation direction component of the actual hand force Fb can be obtained from Eq. 2.

$$Fa=(A1+A2+ \ldots +Am)*F$$

$$Fb=(B1+B2+ \ldots +Bm)*F \qquad \text{Eq. 2}$$

Next, the separator 204a calculates the sum of forces that all components of the operation direction component of the actual hand force Fa act about the desired total floor reaction force central point, based on the finally-corrected desired hand position/posture and the operation direction component of the actual hand force Fa. They are called a "sum of operation direction components of actual object reaction force about desired total floor reaction force central point". This force is expressed by the force and moment of force in the three-dimensional space. The supporting leg coordinate system is used as the coordinate system thereof. Further, moment components in the operation direction component of actual object reaction force about the desired total floor reaction force central point are called a "sum of operation direction components of actual object reaction force moment about desired total floor reaction force central point".

Next, the separator 204a obtains the sum of forces that all components of the non-operation direction component of the actual hand force Fb act about the desired total floor reaction force central point, based on the finally-corrected desired hand position/posture and the non-operation direction component of the actual hand force Fb. This is called a "sum of non-operation direction components of actual object reaction force about desired total floor reaction force central point". This force is also expressed by the force and moment of force in the three-dimensional space. The supporting leg coordinate system is used as the coordinate system thereof. Further, moment components in the non-operation direction component of actual object reaction force about the desired total floor reaction force central point are called a "sum of non-operation direction components of actual object reaction force moment about desired total floor reaction force central point".

The object reaction force moment error separator 204 has a desired hand position action point converter 204b. The converter 204b also implements the above-mentioned processing (calculations) for the desired object reaction force. The desired object reaction force is also expressed by a vector constituting the total motion velocity space similar to the actual hand force. Specifically, since the desired object reaction force is expressed as force whose point of action is set at the desired total floor reaction force central point, the converter 204b converts the point of action into a force and moment of force whose point of action is set at the desired hand position (reference point position of the desired hand). This is called a "desired object reaction force whose point of action is desired hand position".

Further, the object reaction force moment error separator 204 has a desired object reaction force moment component separator 204c. The separator 204c separates the desired object reaction force into the operation direction component and the non-operation direction component by performing the same processing as that mentioned in the above. These are called, respectively, an "operation direction component of desired object reaction force whose point of action is set at desired hand position" and a "non-operation direction component of desired object reaction force whose point of action is set at desired hand position".

Next, the separator 204c obtains the sum of forces that all components of the operation direction component of the desired object reaction force act about the desired total floor reaction force central point, based on the operation direction component of desired object reaction force whose point of action is set at desired hand position and the desired hand position (reference point position of the desired hand). They are called a "sum of operation direction components of desired object reaction force about desired total floor reaction force central point". The force is expressed by the force and moment of force in the three-dimensional space. The supporting leg coordinate system is used as its coordinate system. Further, moment components in the operation direction component of desired object reaction force about the desired total floor reaction force central point are called a "sum of operation direction components of desired object reaction force moment about desired total floor reaction force central point".

Next, the separator 204c obtains the sum of forces that all components of the non-operation direction component of the desired object reaction force act about the desired total floor reaction force central point, based on the non-operation direction component of desired object reaction force whose point of action is set at desired hand position and the desired hand position (reference point position of the desired hand). They are called a "sum of non-operation direction components of desired object reaction force about desired total floor reaction force central point". The force is also expressed by the force and moment of force in the three-dimensional space. The supporting leg coordinate system is also used as its coordinate system. Further, moment components in the non-operation direction components of desired object reaction force about the desired total floor reaction force central point are called a "sum of non-operation direction components of desired object reaction force moment about desired total floor reaction force central point".

Subsequently, at a summing point 204d, a sum of operation direction components of object reaction force error moment about desired total floor reaction force central point is obtained by subtracting the, thus calculated, sum of operation direction components of desired object reaction force moment about desired total floor reaction force central point from the sum of operation direction components of actual object reaction force moment about desired total floor reaction force central point.

Further, at a summing point 204e, a sum of non-operation direction components of object reaction force error moment about desired total floor reaction force central point is obtained by subtracting the sum of non-operation direction components of desired object reaction force moment about desired total floor reaction force central point from the sum of non-operation direction components of actual object reaction force moment about desired total floor reaction force central point.

It should be noted that, since components other than the moment component of the object reaction force error about the desired total floor reaction force central point do not very contribute in maintaining the posture of the robot 1, they are neglected in this embodiment. Also, instead of the finally-corrected desired hand position/posture, the actual hand position/posture calculated by the kinematics calculation with the use of the actual joint angles of the leg links 2 and arm links 5, may be used.

Returning to the explanation of FIG. 14, the sum of operation direction components of object reaction force error moment about the desired total floor reaction force central point, obtained in the manner mentioned above is utilized in calculating a compensating total floor reaction force's moment, as will be explained below. On the other hand, the sum of non-operation direction components of object reaction force error moment about the desired total floor reaction force central point is inputted to the object reaction force equilibrium control distributor 208.

Figure 17:
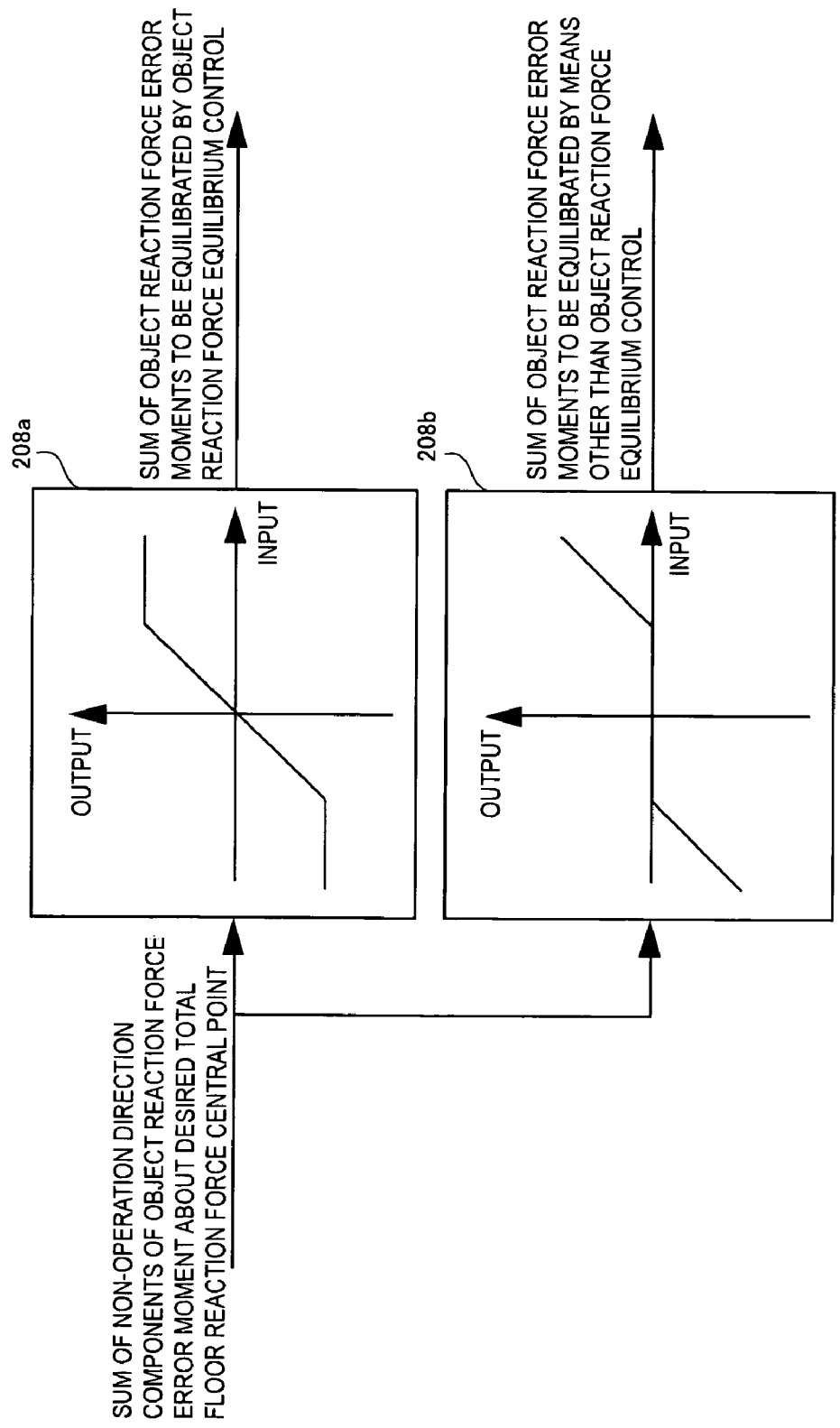
FIG. 17 is a block diagram showing the configuration of an object reaction force equilibrium control distributor of the posture stabilization main controller illustrated in FIG. 14.

Explaining the object reaction force equilibrium control distributor 208 with reference to FIG. 17, the distributor 208 comprises functions 208a and 208b. The object reaction force equilibrium control distributor 208 inputs the sum of non-operation direction components of object reaction force error moment about the desired total floor reaction force central point to the functions 208a and 208b such that they output a sum of the object reaction force error moments that is to be equilibrated or balanced by the object reaction force equilibrium control and a sum of the object reaction force error moments that is to be equilibrated or balanced by the means other than the object reaction force equilibrium control.

The object reaction force equilibrium control is a control that is implemented in the object reaction force equilibrium controller 202 in order to achieve the foregoing Method 2). To state briefly, as described above, it is the control to generate the moment of gravity by displacing the body position such that the sum of the object reaction force error moments is canceled out.

In the example shown in FIG. 17, although both inputs and outputs are expressed in terms of scalar quantities in one dimension, in fact, they have X-direction component and Y-direction component, and the processing shown in the figure is implemented for each of the component. However, since Z-direction component is not relevant to the posture stability, it is neglected.

As shown in the figure, as the function 208a that outputs the sum of the object reaction force error moments to be equilibrated by the object reaction force equilibrium control, a function having a high and low limiter characteristic (saturation characteristic) is used, whereas as the function 208b that outputs the sum of the object reaction force error moments to be equilibrated by the means other than the object reaction force equilibrium control, a function having a dead band characteristic is used.

When the functions are configured to have such characteristics, in order to maintain the dynamic balance, if the absolute value of the sum of non-operation direction components of object reaction force error moment about the desired total floor reaction force central point is equal to or less than a preset value, this control system acts such that the moment is canceled out by conducting the object reaction force equilibrium control. If the moment exceeds the preset value, the control system acts such that the excess is canceled out by mainly generating the object reaction force in the constraint direction of the hand. Thus, by assigning the high and low limiter characteristics, it becomes possible to restrict the amount of displacement of the body position and to prevent the posture from becoming unnatural in terms of geometric.

Figure 18:
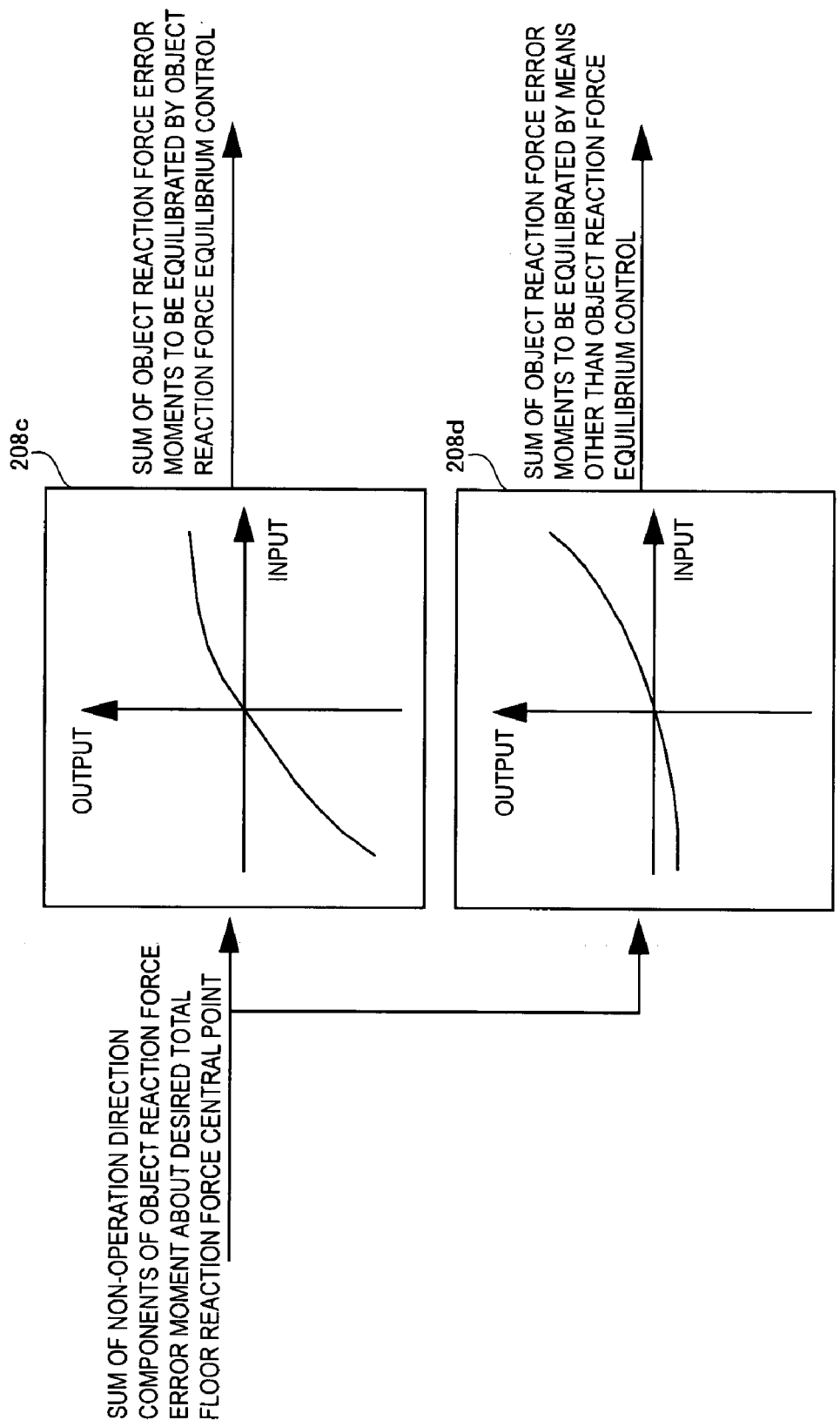
FIG. 18 is a block diagram, similar to FIG. 17, and similarly showing the configuration of the object reaction force equilibrium control distributor of the posture stabilization main controller illustrated in FIG. 14.

As the two functions 208a and 208b that determine the input/output relationship, functions other than those illustrated in the figure may be also utilized. For instance, as shown in FIG. 18, characteristics of curved lines 208c and 208d may be used. Either in the examples shown in FIG. 17 or FIG. 18, the function should be selected in accordance with the nature or property of object or the type of work.

It should be also noted that, although the sum of outputs of the two functions that determine the input/output relationship should be basically equal to the inputs, they need not be strictly the same. In particular, in the leg compliance control or arm compliance control, if the absolute value of a desired value is great, the generated force tends to be small with respect to the desired value. For the purpose of correcting this, in the area where the absolute value of the input is great, it is occasionally preferable to make the absolute value of the sum of outputs of functions greater than the absolute value of the input. Further, instead of distributing the X-direction component and Y-direction component independently, it is also possible to determine each output by using a two-input function that inputs both the X-direction component and Y-direction component.

Returning to the explanation of FIG. 14, the sum of the object reaction force error moments to be equilibrated by the means other than the object reaction force equilibrium control, thus distributed by the object reaction force equilibrium control distributor 208, is multiplied at a multiplication point 214 by −1 such that its polarity is reversed, and is inputted to the compensating moment distributor 210 as the object reaction force compensating moment that is required by the means other than the object reaction force equilibrium control. The sum of the object reaction force error moments to be equilibrated by the object reaction force equilibrium control is inputted to the object reaction force equilibrium controller 202.

Next, the object reaction force equilibrium controller 202 outlined in the foregoing will be explained in detail.

First, explaining the function thereof, the object reaction force equilibrium controller 202 inputs the desired body position/posture or the like as described above, corrects the desired body position/posture and desired total floor reaction force such that they are dynamically equilibrated with the sum of the object reaction force error moments to be balanced by the object reaction force equilibrium control, and outputs the corrected desired body position/posture and a compensating total floor reaction force's moment for object reaction force equilibrium control.

In other words, the characteristic of the controller 202 is that, the gravity moment generated by displacing the desired body position/posture is dynamically equilibrated with the sum of the object reaction force error moments to be equilibrated or balanced by the object reaction force equilibrium control over a long period of time such that the correction amount of the desired total floor reaction force returns to zero.

As discussed above, the object reaction force equilibrium controller 202 is configured to achieve the Method 2) and this is a technique already proposed by the applicant in Japanese Laid-Open Patent Application No. Hei 10 (1998)-230485. However, this embodiment is different from the technique in that only the latter part of the configuration of the object reaction force equilibrium controller in the technique is used, and in that it is modified such that, in the element where the aforesaid "object reaction force error" is inputted, the "sum of the object reaction force error moments to be equilibrated by the object reaction force equilibrium control" is inputted.

Figure 19:
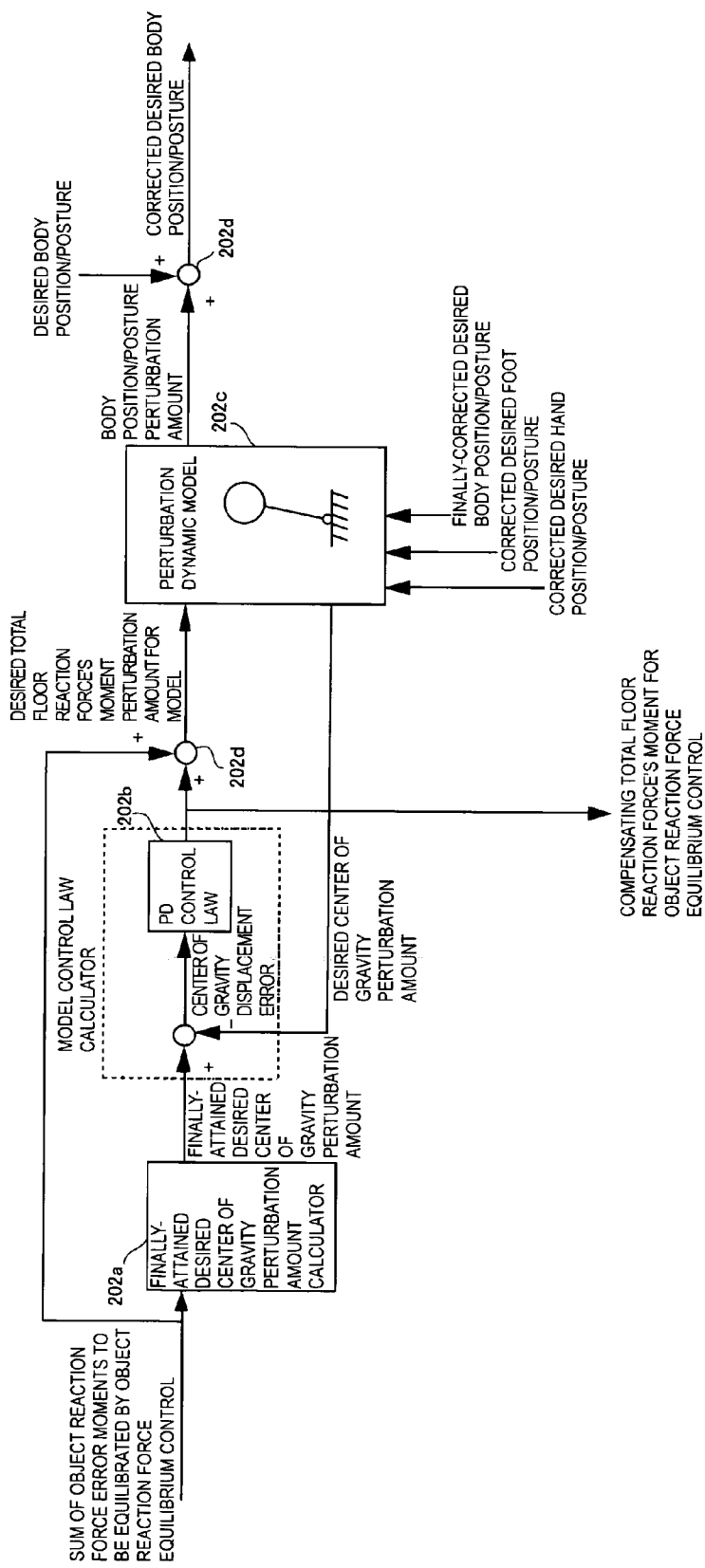
FIG. 19 is a block diagram showing the configuration of an object reaction force equilibrium controller of the posture stabilization main controller illustrated in FIG. 14.

FIG. 19 is a block diagram showing the configuration of the object reaction force equilibrium controller 202 and it includes a finally-attained desired center of gravity perturbation amount calculator 202a, a model control law calculator 202b and a perturbation dynamic model 202c.

Those inputted thereto are the sum of the object reaction force error moments to be equilibrated by the object reaction force equilibrium control, desired body position/posture, finally-corrected desired hand position/posture, finally-corrected desired body position/posture and finally-corrected desired foot position/posture. It should be noted that, among them, when an approximate calculation is used in the object reaction force equilibrium control, i.e., when the perturbation dynamic model 202c is an approximated model, the finally-corrected desired hand position/posture, finally-corrected desired body position/posture and finally-corrected desired foot position/posture are unnecessary.

The aforesaid posture stabilization compensating moment is not inputted to the object reaction force equilibrium controller 202, not even partially. The posture stabilization compensating moment is a moment provided to the robot from the exterior, to restore the center of gravity displaced due to posture inclination. However, since the function of object reaction force equilibrium controller 202 is to cancel out the steady object reaction force error by displacing the center of gravity of the desired posture, it can not restore the center of gravity displaced due to posture inclination.

The detail will be explained. The inputted sum of the object reaction force error moments to be equilibrated by the object reaction force equilibrium control is inputted to the finally-attained desired center of gravity perturbation amount calculator 202a.

An amount of center of gravity perturbation necessary for keeping the equilibrium by canceling out the sum of the object reaction force error moments to be equilibrated by the object reaction force equilibrium control over a long period of time is called a "finally-attained desired center of gravity perturbation amount". The finally-attained desired center of gravity perturbation amount calculator 202a calculates the finally-attained center of gravity perturbation amount from the aforesaid sum and outputs it.

The finally-attained desired center of gravity perturbation amount is inputted to the model control law calculator 202b.

The model control law calculator 202b will be explained. Defining that a difference between the finally-attained desired center of gravity perturbation amount and the desired center of gravity perturbation amount outputted from the perturbation dynamic model 202c is a center of gravity displacement error, the model control law calculator 202b determines and outputs the compensating total floor reaction force's moment for object reaction force equilibrium control that is a moment to converge the center of gravity displacement error to zero, in accordance with a PD control law.

The perturbation dynamic model 202c is a model expressing the relationship between a desired total floor reaction force's moment perturbation amount for the model and a body position/posture perturbation amount, when motion (perturbation) of the desired working pattern is assigned with a certain constraint condition.

Explaining a summing point 202d immediately after the output of the model control law calculator 202b, at this summing point 202d, the compensating total floor reaction force's moment for object reaction force equilibrium control is added to the sum of the object reaction force error moments to be equilibrated by the object reaction force equilibrium control, and the resultant sum is inputted to the perturbation dynamic model as the desired total floor reaction force's moment perturbation amount for the model (model input amount). The body position/posture perturbation amount is calculated to be a value that is corresponding to the input by the aforesaid perturbation dynamic model. The calculated result is added to the desired body position/posture at the summing point 202d and the corrected desired body position/posture is outputted.

Returning to the explanation of FIG. 14, thus, the outputs of the object reaction force equilibrium controller 202 are the corrected desired body position/posture obtained by correcting the inputted desired body position/posture and the compensating total floor reaction force's moment for object reaction force equilibrium control. The outputted compensating total floor reaction force's moment for object reaction force equilibrium control is, as shown in the figure, inputted to the compensating moment distributor 210, which will be explained subsequently.

In the above, the reason why only the moment component among components of the compensating total floor reaction force for object reaction force equilibrium control is outputted from the controller 202, is that, among components of the compensating total floor reaction force for object reaction force equilibrium control's moment, what is significant for the posture stabilization of the robot is the moment component about X-axis or Y-axis. Although it will be better to configure the system to take components other than the moment component into account, notable effect would not be expected with this.

Figure 20:
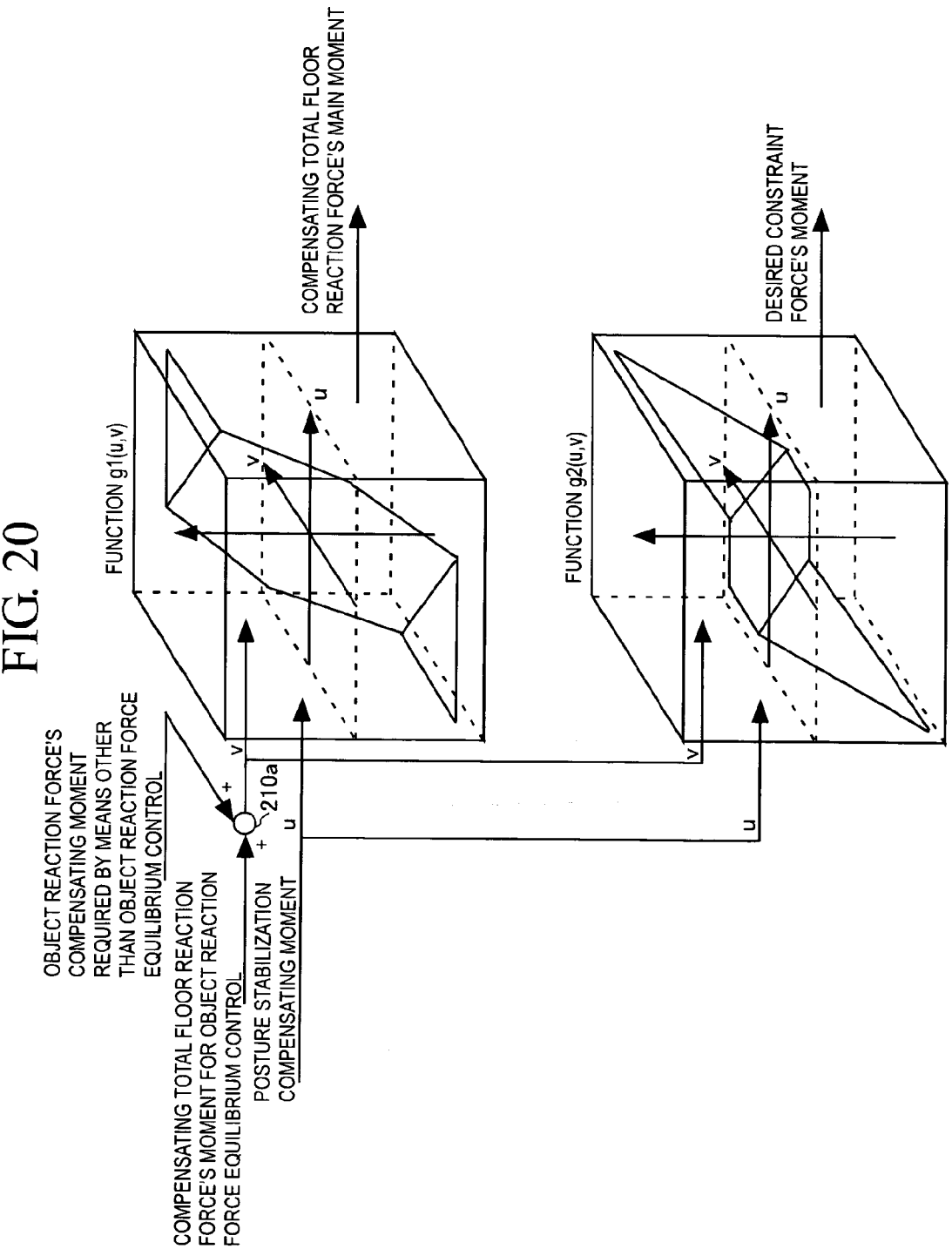
FIG. 20 is a block diagram showing the configuration of a compensating moment distributor of the posture stabilization main controller illustrated in FIG. 14.

The compensating moment distributor 210 will be explained. As shown in FIG. 20, the compensating moment distributor 210 comprises two functions that input the compensating total floor reaction force's moment for object reaction force equilibrium control, object reaction force's compensating moment required by the means other than the object reaction force equilibrium control and posture stabilization compensating moment, and distribute or divide them into a desired constraint force's moment and a compensating total floor reaction force's main moment.

Here, the object reaction force's compensating moment required by the means other than the object reaction force equilibrium control is, as described above, a value obtained by multiplying the sum of the object reaction force error moments to be equilibrated by the means other than the object reaction force-equilibrium control by −1 at the multiplication point 214.

Further, the desired constraint force's moment is, among the aforesaid inputs, a moment to be generated about the desired total floor reaction force central point by the object reaction force in the constraint direction, and the compensating total floor reaction force's main moment is, among the aforesaid inputs, a moment to be generated about the desired total floor reaction force central point by the total floor reaction force.

The distribution processing will be explained with reference to FIG. 20 in the following. In the example shown in the figure, although both inputs and outputs are expressed in scalar quantities in one dimension, in fact, there are X-direction and Y-direction components and the processing is conducted with respect to each component. However, Z-direction component is neglected since it is not relevant to the posture stability.

The distributor 210 has a summing point 210a. At the summing point 210a, the compensating total floor reaction force's moment for object reaction force equilibrium control and object reaction force's compensating moment required by the means other than the object reaction force equilibrium control are added and the sum is inputted to the two functions. Here, when the posture stabilization compensating moment is expressed by u and the aforesaid sum is expressed by v, a value of function g1 (u, v), one of the two functions, is obtained and the value is determined as the compensating total floor reaction force's main moment. Similarly, another value of function g2 (u, v), the other one of the two functions, is obtained and the value is determined as the desired constraint force's moment. The individual functions are a function of two inputs and one output.

These functions can be expressed by the following equations, for instance. Here, Cmax and Cmin in the equations are preset values.

When u+v>Cmax:

$g1(u, v)=Cmax$

When u+v<Cmin:

$g1(u, v)=Cmin$

When Cmin≦u+v≦Cmax:

$g1(u, v)=u+v$      Eq. 3

$g2(u, v)=u+v-g1(u, v)$      Eq. 4

In FIG. 20, the functions described by the Eqs. 3 and 4 are expressed in such a manner that their inputs u and v are shown by orthogonal axes on a level surface and their output values are shown by height.

Basically, the two functions should be selected such that the sum of inputs of the compensating moment distributor (sum of the compensating total floor reaction force's moment for object reaction force equilibrium control, object reaction force's compensating moment required by the means other than the object reaction force equilibrium control and posture stabilization compensating moment) becomes equal to the sum of outputs (sum of the desired constraint force's moment and compensating total floor reaction force's main moment). Specifically, the two functions should be selected such that g1 (u, v)+g2 (u, v)=u+v establishes at every instance.

Also, when terming the compensating total floor reaction force's moment for object reaction force equilibrium control u, the object reaction force's compensating moment required by the means other than the object reaction force equilibrium control v and the posture stabilization compensating moment w, the compensating total floor reaction force's main moment and desired constraint force's moment may be determined from respective values of functions g1 (u, v, w) and g2 (u, v, w) with three inputs.

In that case, the functions should be basically selected such that g1 (u, v, w)+g2 (u, v, w)=u+v+w establishes at every instance as well. However, in view of control error of the composite compliance control etc., the sum of outputs may be made greater. In particular, since the posture stabilization compensating moment is a feedback amount, even if the sum of output components becomes different from the posture stabilization compensating moment by a few dozen percent due to affection by the posture stabilization compensating moment, it does not cause trouble.

Returning to the explanation of FIG. 14, the desired constraint force's moment (one moment of moments outputted from the compensating moment distributor 210) is sent to a summing point 215 where the moment is subtracted from the aforesaid sum of operation direction component of object reaction force error moment about desired total floor reaction force central point.

On the other hand, at a summing point 216, the difference between the sum of operation direction components of object reaction force error moment about desired total floor reaction force central point and the desired constraint force's moment is subtracted from the compensating total floor reaction force's main moment (the other moment of moments outputted from the compensating moment distributor 210), and the compensating total floor reaction force's moment is outputted.

It should be noted that, if the compliance control of the arm actuators 92 has high accuracy and the control can be performed such that the sum of operation direction components of object reaction force error moment about desired total floor reaction force central point becomes almost equal to the desired constraint force's moment, the compensating total floor reaction force's main moment can be immediately regarded as the compensating total floor reaction force's moment, without subtracting the difference between the sum of operation direction components of object reaction force error moment about desired total floor reaction force central point and the desired constraint force's moment at the summing point 216.

It should be also noted that, it is possible to remove the summing point 216 and to regard the compensating total floor reaction force's moment as the compensating total floor reaction force's main moment, such that the difference between the sum of operation direction components of object reaction force error moment about desired total floor reaction force central point and the desired constraint force's moment (output of the summing point 215) is subtracted from the sum of the object reaction force error moments to be equilibrated by object reaction force equilibrium control.

The aforesaid desired constraint force's moment is also inputted to the corrected desired object reaction force calculator 206.

Figure 21:
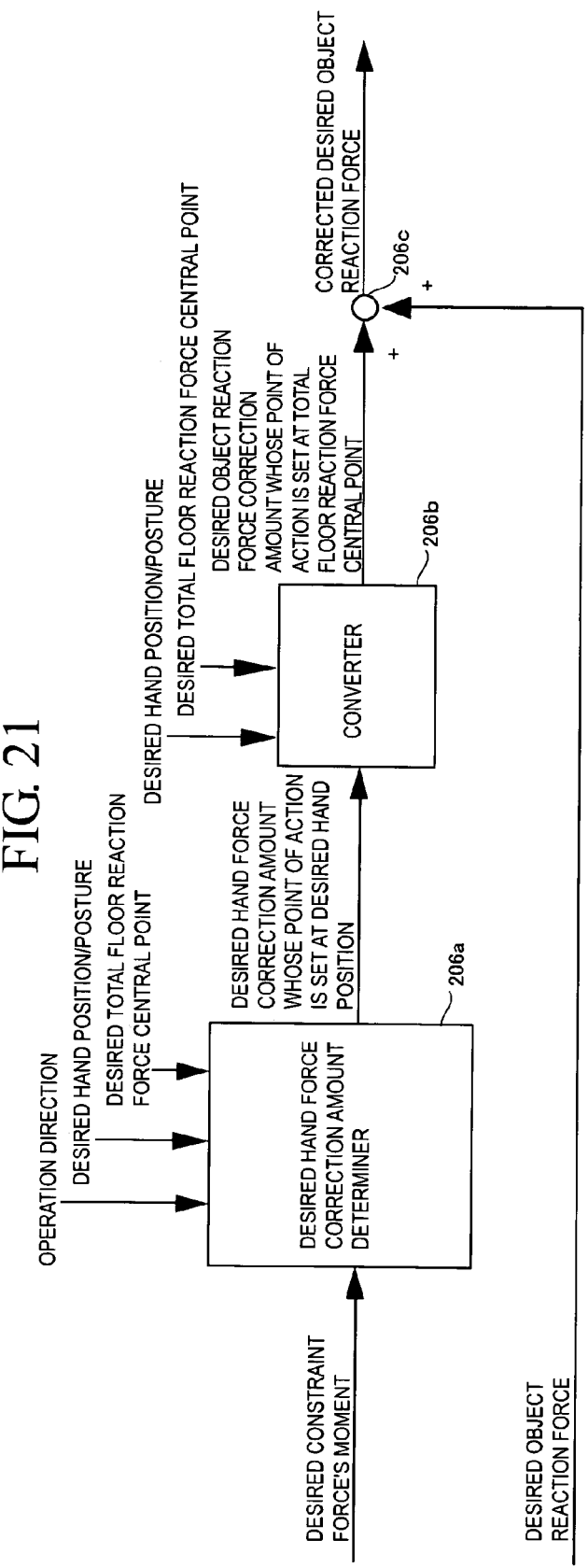
FIG. 21 is a block diagram showing the configuration of a corrected desired object reaction force calculator of the posture stabilization main controller illustrated in FIG. 14.

The configuration of corrected desired object reaction force calculator 206 is shown in FIG. 21. As illustrated in the figure, the corrected desired object reaction force calculator 206 inputs the desired hand position/posture (or the finally-corrected desired hand position/posture), desired constraint force's moment, desired total floor reaction force central point position, operation direction and desired object reaction force, and calculates the corrected desired object reaction force based on the inputs and outputs the calculated result.

The processing will be explained in the following. The calculator 206 has a desired hand force correction amount determiner 206a, a converter 206b and a summing point 206c. The desired hand force correction amount determiner 206a determines, as will be described below, a desired hand force correction amount that is a correction amount of the desired object reaction force, which is expressed so as to define the desired hand position (or the finally-corrected desired hand position) as the point of action.

In other words, the determiner 206a determines the desired hand force correction amount such that, the difference between the sum of moments acting about the desired total floor reaction force central point and the desired constraint force's moment when the desired hand force correction amount is imparted on the desired hand position (or the finally-corrected desired hand position), approaches zero. The determiner 206a determines the desired hand force correction amount in such a way that it is a force and moment of force in the operation direction and it does not include the non-operation direction component. The desired hand force correction amount is expressed in the supporting leg coordinate system.

The simplest method of determination is described as follows. First, two vectors in the operation direction are freely selected. Each vector is obtained by linear combining orthogonal basic vectors A1, A2, . . . , Am in the operation space appropriately. These vectors are then named Q1, Q2, respectively.

Next, the desired hand force correction amount is defined as aQ1+bQ2. Here, a and b are coefficients.

Then, a moment M of a resultant force acting on the desired total floor reaction force central point when the desired hand force correction amount aQ1+bQ2 is imparted on the desired hand position (or the finally-corrected desired hand position) is calculated utilizing dynamic calculation.

Expressing an X-direction component of the obtained M by Mx and a Y-direction component by My, the relationship between Mx, My and a, b is expressed as the following simultaneous linear equation. Here, k11, k12, k21 and k22 are coefficients.

$$Mx = ak11 + bk12$$

$$My = ak21 + bk22 \qquad \text{Eq. 5}$$

Next, a and b are determined such that Mx becomes equal to an X-direction component of the desired constraint force's moment and My becomes equal to an Y-direction component of the desired constraint force's moment. Specifically, the simultaneous linear equation of Eq. 5 is solved with respect to a and b, and by substituting the value of the X-direction component of the desired constraint force's moment for Mx and a value of the Y-direction component for My, the values a, b are obtained.

Next, the desired hand force correction amount aQ1+bQ2 is obtained by using the vectors Q1, Q2 and the aforesaid values a, b. The obtained correction amount is inputted to the converter 206b. The converter 206b outputs the desired object reaction force correction amount whose point of action is set at the total floor reaction force central point, by converting expression of the desired hand force correction amount in such a manner that its point of action is changed from the desired hand position (or the finally-corrected desired hand position) to the total floor reaction force central point.

Finally, by adding the desired object reaction force correction amount (whose point of action is set at the total floor reaction force central point) to the desired object reaction force (whose point of action is set at the total floor reaction force central point) at the summing point 206c, the corrected desired object reaction force (whose point of action is set at the total floor reaction force central point) is outputted. The corrected desired object reaction force is a vector in the total motion velocity space.

Returning to the explanation of FIG. 14, the corrected desired object reaction force thus obtained and the aforesaid corrected desired body position/posture as well as the compensating total floor reaction force's moment are the final outputs from the posture stabilization main controller 106. As shown in FIG. 5, the corrected desired object reaction force is inputted to the arm main controller 104, the compensating total floor reaction force's moment to the leg main controller 102 and the corrected desired body position/posture to both of the controllers.

The functions of the leg main controller 102 and arm main controller 104 will be again explained. The leg main controller 102 corrects the desired foot position/posture, as described above, such that the moment component of the actual total floor reaction force acting about the desired total floor reaction force central point position is equal to the sum of the desired total floor reaction force's moment (normally zero) and the compensating total floor reaction force's moment, and controls the leg joint actuators by outputting the actuator displacement commands such that the actual joint displacements follow the desired leg joint displacements determined by the corrected desired body position/posture and the corrected desired foot position/posture.

The arm main controller 104 corrects the desired hand position/posture, as described above, in response to the difference between the actual object reaction force (actual hand force) detected by the force sensor 58 at the hand 40R(L) and the corrected desired object reaction force by using the PD control or the like such that the difference approaches zero. Further it controls the arm joint actuators by outputting the actuator displacement commands such that the actual joint displacements follow the desired arm joint displacements determined by the corrected desired body position/posture (or the finally-corrected desired body position/posture) and the corrected desired hand position/posture.

As explained above, the posture stabilization main controller 106 is configured such that it separates the object reaction force error moment acting on the desired total floor reaction force central point into the operation direction component and non-operation direction component, cancels out a part of dynamic unbalance generated by the non-operation direction component by the object reaction force equilibrium controller, while canceling out the rest of the dynamic unbalance by correcting the operation direction component of desired object reaction force's moment that must act about the desired total floor reaction force central point, i.e., by correcting the motion of arm to change the operation direction component.

In other words, in the technique proposed earlier, if the unexpected reaction force acting from the object changes sharply, the motion to brace legs (make legs hold) by driving the foot 22R(L) (and leg links 2) to move (controlled in the object reaction force equilibrium controller 202), can be decreased or eliminated with the aid of motion of the arm links 5. With this, since there is no possibility that the total floor reaction force's moment arises beyond a marginal limit, it becomes possible to maintain the dynamic balance of the robot 1 and prevent the robot from being tilted or tipping over.

Further, since the motion of the arm is corrected such that the operation direction component changes, when the robot 1 is controlled to maintain the dynamic balance or to restore a tilted posture, the motion of the object is not affected.

Finally, the stability of the aforesaid control system will be explained.

The relationships among the desired constraint force's moment that is a correction amount of the operation direction component of desired object reaction force's moment that must act about the desired total floor reaction force central point, the sum of operation direction components of object reaction force error moment about the desired total floor reaction force central point and the sum of non-operation direction components of the same are as illustrated in FIG. 14.

For ease of understanding, it is assumed to be configured such that, of the sum of operation direction components of object reaction force error moment about the desired total floor reaction force central point and the sum of non-operation direction components of the same separated by the object reaction force moment error separator 204 in the posture stabilization main controller 106, dynamic unbalance generated by the sum of non-operation direction components is all canceled out by correcting the operation direction component of desired object reaction force's moment that must act about the desired total floor reaction force central point. In other words, it is assumed that the object reaction force equilibrium control is not performed.

Figure 22:
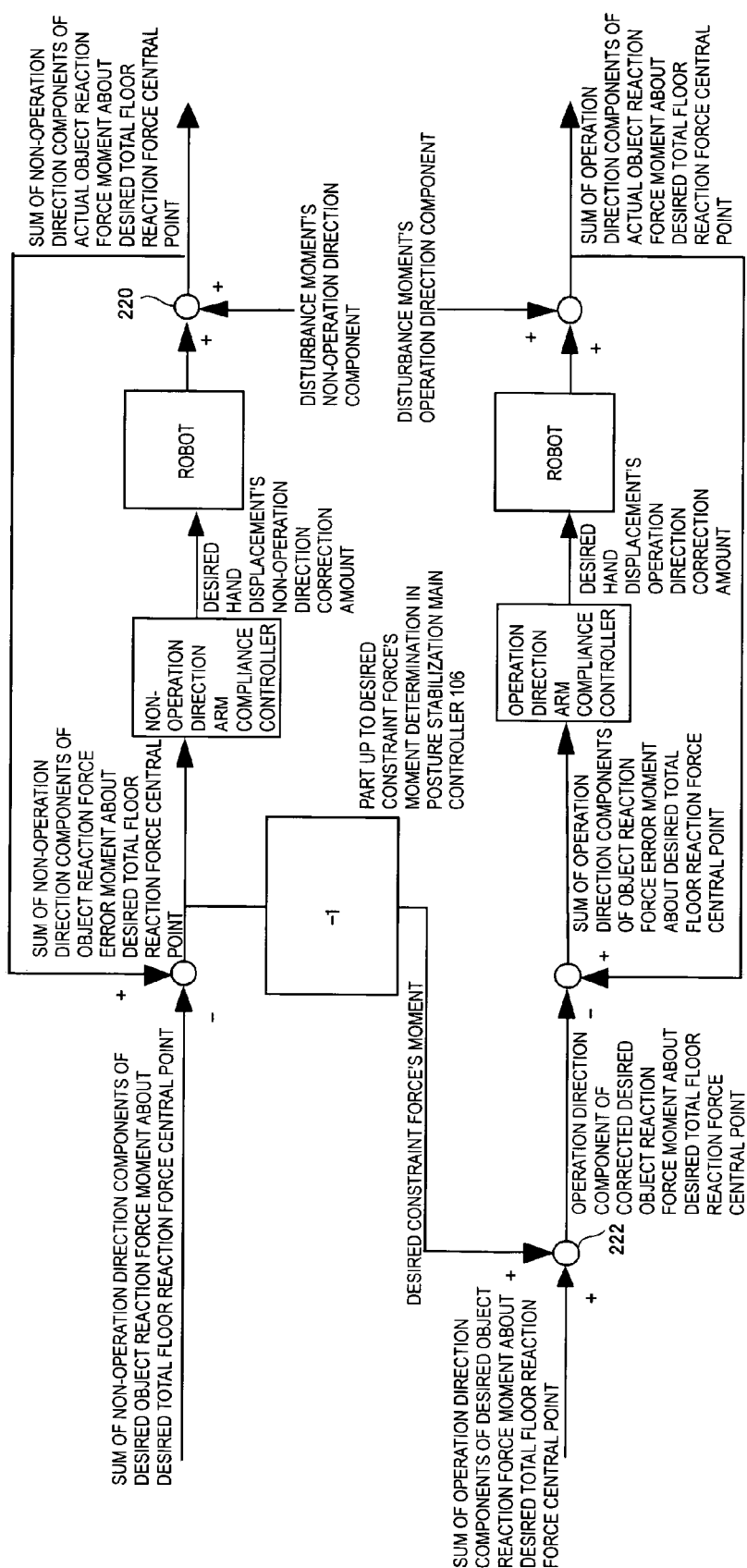
FIG. 22 is a block diagram showing a modified and simplified control system obtained with focus on the object reaction force, in order to explain the effects and advantages of the system illustrated in FIG. 5.

In that case, the arm control system (control system comprising the arm main controller 104, actuators 92, actuator drivers 88 and the like, shown in FIG. 5) and the control system comprising the posture stabilization main controller 106 can be simplified, as shown in FIG. 22, when focusing on the object reaction force. A disturbance moment illustrated in FIG. 22 is an object reaction force generated from the reason that the object exhibits unexpected behavior due to the fact that its characteristics are different from supposed ones, i.e., is non-supposed object reaction force. For example, this happens when friction of the object is different from that supposed in advance. An operation direction component in the disturbance moment is called an "operation direction component of disturbance moment" and a non-operation direction component in the disturbance moment is called a "non-operation direction component of disturbance moment".

In FIG. 22, when the non-operation direction component of disturbance moment inputted to a summing point 220 varies, the desired constraint force's moment is determined so as to cancel out the component and is added at a summing point 222, in such a way that the sum of operation direction components of desired object reaction force moment about desired total floor reaction force central point is corrected, the desired hand position/posture is corrected by the correction amount at an operation direction arm compliance controller, and the actuator displacement commands of the arm links 5 are then corrected, such that the arm links 5 of the robot 1 are driven to maintain the dynamic balance. Even if the operation direction component of disturbance moment varies, the desired value for the arm compliance control does not vary.

Figure 23:
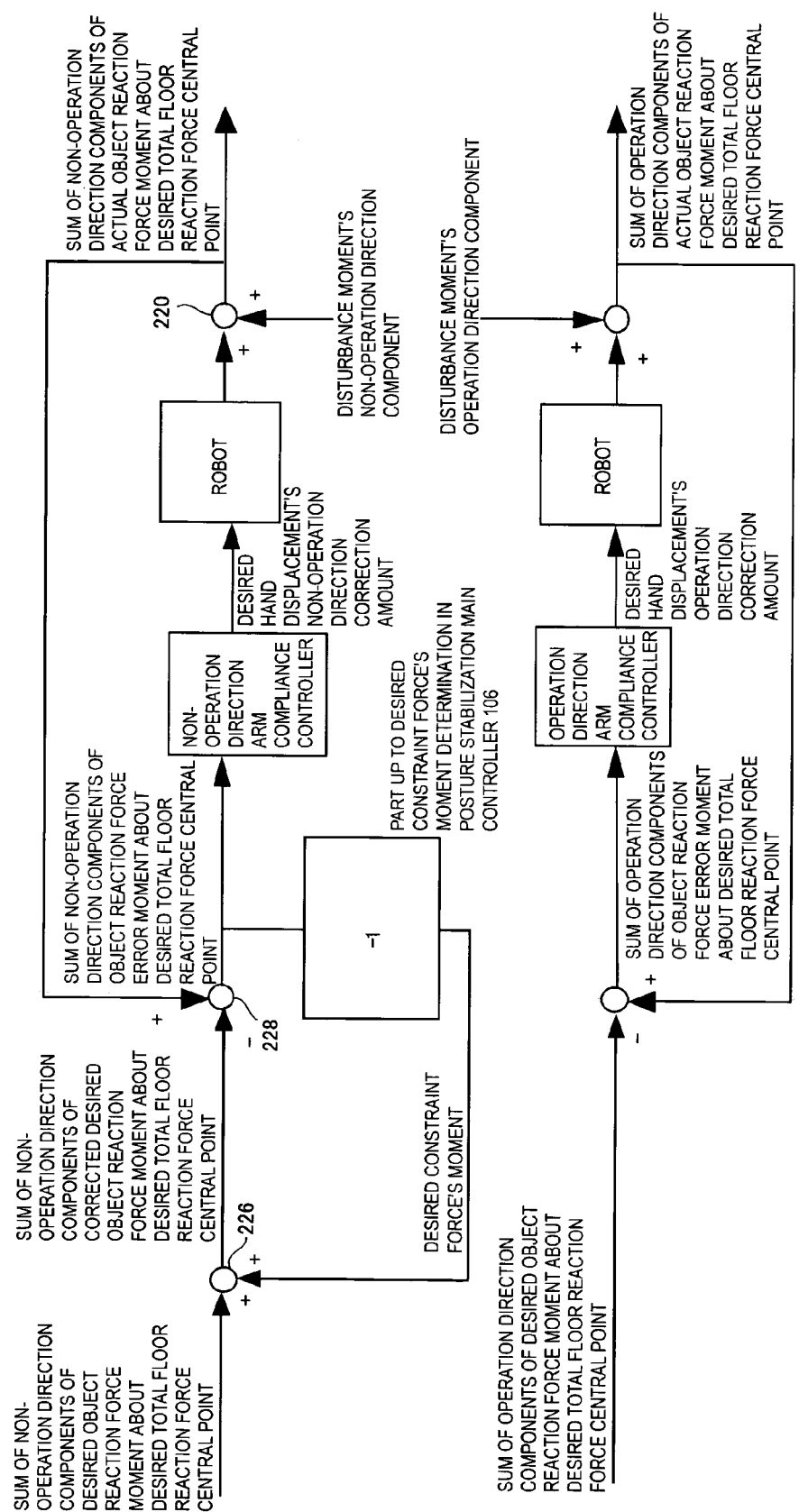
FIG. 23 is a block diagram also showing a modified and simplified control system obtained with focus on the object reaction force, in order to explain the effects and advantages of the system illustrated in FIG. 5.

On the other hand, if it is assumed to be configured such that the posture stabilization main controller 106 cancels out the dynamic unbalance generated by the sum of non-operation direction components by correcting the non-operation direction component of desired object reaction force's moment that must act about the desired total floor reaction force central point, the control system made up of the arm control system and posture stabilization main controller 106 can be simplified as illustrated in FIG. 23, if focusing on the object reaction force.

In that case, the feedback loop including the posture stabilization main controller becomes positive and diverges or oscillates.

To be specific, the feedback loop in which the desired constraint force's moment is calculated from the sum of non-operation direction components of object reaction force error moment about desired total floor reaction force central point by the posture stabilization main controller and is added to the input (sum of non-operation direction components of desired object reaction force moment about desired total floor reaction force central point) at a summing point 226 to determine the sum of non-operation direction components of corrected desired object reaction force moment about desired total floor reaction force central point that is then subtracted from the sum of non-operation direction components of actual object reaction force moment about desired total floor reaction force central point at a summing point 228 to determine the sum of non-operation direction components of object reaction force error moment about desired total floor reaction force central point becomes positive and diverges or oscillates.

In other words, in the configuration shown in FIG. 23, once the non-operation direction component of disturbance moment is generated, in order to cancel out the generated moment, the sum of non-operation direction components of corrected desired object reaction force moment about desired total floor reaction force central point increases or decreases unlimitedly, thereby rendering the system to diverge or oscillate.

In contrast, in the posture control system of a mobile robot according to this embodiment, as shown in FIG. 14 or the like, the object reaction force's moment about desired total floor reaction force central point is separated to the sum of operation direction components and the sum of non-operation direction components and, as shown in FIG. 22, the feedback loop is arranged not to be positive, thereby enabling to prevent such divergence or oscillation from occurring. Specifically, it is configured such that a value fed-back on the non-operation direction side is added to the operation direction side whereby such divergence or oscillation can be prevented.

Figure 25:
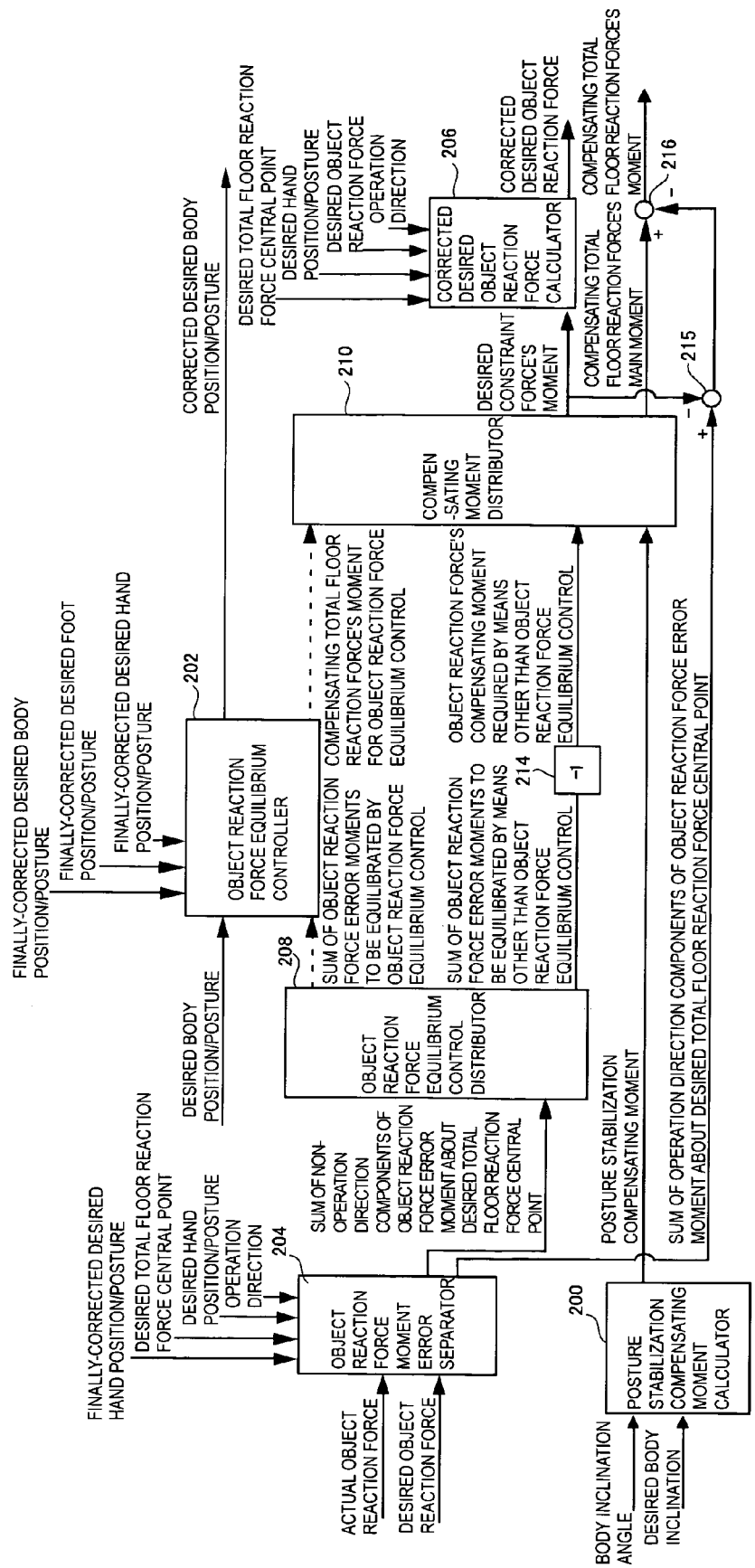
FIG. 25 is a block diagram, similar to FIG. 14, but showing the configuration of a posture stabilization main controller in a posture control system of a mobile robot according to a second embodiment of the present invention.

FIG. 25 is a view showing a posture control system of a mobile robot according to a second embodiment of the present invention.

Focusing on the points of difference from the first embodiment, in the second embodiment, among outputs from the object reaction force equilibrium control distributor 208, the sum of the object reaction force error moments to be equilibrated by object reaction force equilibrium control is made zero (indicated by the dashed line in the figure), whilst all outputs from the object reaction force equilibrium control distributor 208 are made only the sum of the object reaction force error moments to be equilibrated by the means other than the object reaction force equilibrium control.

Other configuration and effects are the same as those of the first embodiment. Since the posture control system of the mobile robot according to the second embodiment is thus configured, the same effects as in the system according to the first embodiment can be achieved.

Figure 26:
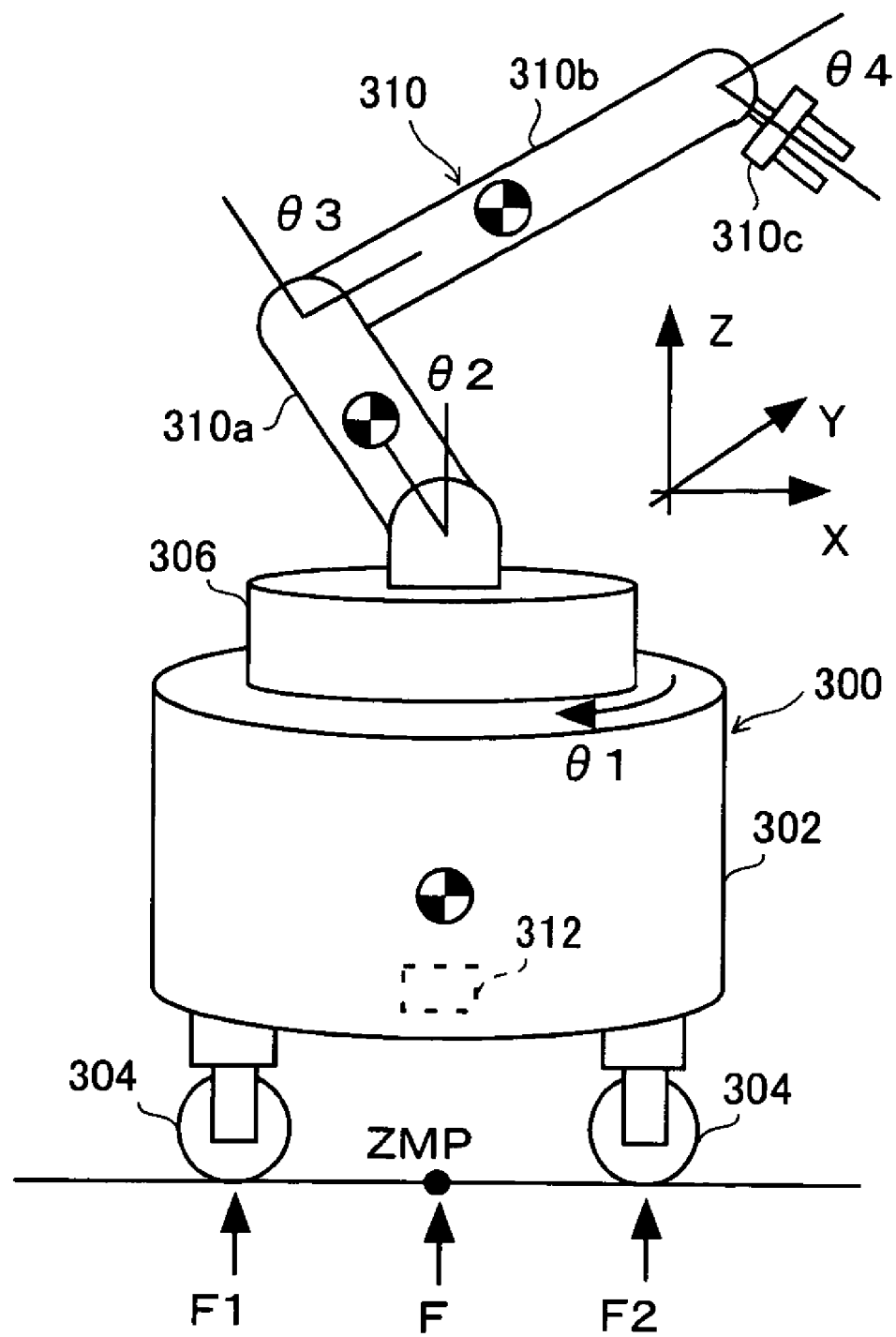
FIG. 26 is an explanatory view showing the configuration of a posture control system of a mobile robot according to a third embodiment of the present invention.

FIG. 26 is a view showing a posture control system of a mobile robot according to a third embodiment of the present invention.

Focusing on the points of difference from the first embodiment, in the third embodiment, instead of the biped mobile robot 1, posture control is implemented on a wheel mobile robot as shown in the figure.

Explaining this in the following, as illustrated, the wheel robot 300 has a cylindrical body 302 and four wheels (only two wheels are shown in the figure) 304 fixed thereto via active suspensions (not shown) that stroke up and down (in the Z-axis direction). A mount 306 is rotatably disposed at the top of the body 302 and a bendable arm (arm link) 310 is disposed thereon.

To be more specific, the arm 310 comprises a first link 310*a* fixed to the mount 306, a second link 310*b* connected to the first link 310*a* via a joint (not shown) and a hand 310*c* connected to the free end of the second link 310*b* via a joint (not shown). The respective joints accommodate actuators such as electric motors or the like.

An electronic control unit (ECU) 312 comprising a microcomputer is housed in the body 302. An inclination sensor (not shown) is disposed in the vicinity of the center of gravity of the body 302 and generates an output indicative of the inclination and its angular velocity of the body 302 relative to the Z-axis. A load sensor (not shown) is disposed in each of the wheels 304 and detects the floor reaction forces (load) F1, F2, . . . that act on the respective four wheels from the contact surface.

Here, defining rotational angle about the Z-axis of the mount 306 as $\theta 1$, angle relative to the Z-axis of the first link 310*a* as $\theta 2$, relative angle of the second link 310*b* with respect to the first link 310*a* as $\theta 3$ and relative angle of the hand 310*c* with respect to the second link 310*b* as $\theta 4$, the desired motion of the mobile robot 300 can be expressed by motion patterns comprising $\theta 1$ to $\theta 4$ and the ZMP.

Further, in the posture control of the illustrated mobile robot 300, taking a case that the angle $\theta 2$ relative to the Z-axis of the first link 310*a* is to be controlled, $\theta 2$ corresponds to the desired body position of the legged mobile robot 300 and the set of $\theta 1$, $\theta 3$, $\theta 4$ corresponds to the desired body posture in the first embodiment. And, $\theta 4$ corresponds to the position/posture of the hand 310*c*. The operation of the electronic control unit (ECU) 312 that controls the active suspensions corresponds to the operation of the composite compliance motion determiner in the configuration shown in FIG. 8 in the first embodiment. The electronic control unit controls to distribute or divide the weight F into F1 to F4.

Accordingly, when the above-mentioned control is implemented on the wheel mobile robot 300 in the third embodiment, the same effects as the posture control of the legged mobile robot 1 described in the first embodiment can be achieved.

As stated above, a posture control system of a mobile robot 1, 300 according to the first to third embodiments is configured have at least a body 3, a locomotive mechanism (leg links 2 or wheels 304) and at least one arm link 5 (or arm 310) that can act a force on an object; characterized in that; when unexpected external force acts, the arm link is driven such that, in response to a first external force that is a component in a predetermined direction of the unexpected external force (the sum of non-operation direction components of object reaction force error moment about desired total floor reaction force central point), a second external force acts on the arm link in a direction orthogonal to the predetermined direction (the object reaction force compensating moment required by the means other than the object reaction force equilibrium control), in other words, the object reaction force compensating moment required by the means other than the object reaction force equilibrium control that can be obtained by reversing a polarity of the sum of the object reaction force error moments that should be equilibrated by the means other than the object reaction force equilibrium control which can be obtained on the basis of the sum of non-operation direction components of object reaction force error moment about desired total floor reaction force central point, i.e., that can be obtained by reversing the polarity of the sum of the object reaction force compensating moments required by the means other than the object reaction force equilibrium control which orthogonally intersects therewith, i.e., that orthogonally intersects therewith, acts, whereby the posture of the robot is stabilized without correcting a desired value.

Further, the posture control system of a mobile robot 1, 300 is configured to have at least a body 3, a locomotive mechanism (leg links 2 or wheels 304) and at least one arm link 5 (or the arm 310) that can act a force on an object; characterized in that: desired motion generating means (desired working pattern generator 100) for generating desired motion (desired object reaction force or desired position/posture) comprising at least a desired arm link position/posture of the robot (desired hand position/posture) and a desired object reaction force that is a desired value of an object reaction force acting on the arm link from the object; actual object reaction force detecting means (force sensor 58, load sensor, ECU 62, 312 for detection and an observer for estimation) for detecting or estimating an actual object reaction force (the actual hand force) that is an actual value of the object reaction force; posture stabilization controlling means (posture stabilization main controller 106) for correcting the desired motion to stabilize a posture of the robot based on at least the detected or estimated actual object reaction force; and an arm driver (actuator 90, 92) driving the arm link based on at least the corrected desired motion.

Further, it is configured such that the posture stabilization controlling means corrects the desired motion to stabilize the posture of the robot based on at least an object reaction force's error (sum of non-operation direction components of object reaction force error moment about the desired total floor reaction force central point) indicating a difference between the actual object reaction force and the desired object reaction force.

Further, it is configured such that the posture stabilization controlling means corrects the desired motion to cancel out all or a part of tilting force generated by a first component of the object reaction force's error (sum of non-operation direction components of object reaction force error moment about the desired total floor reaction force central point) by a second component (object reaction force compensating moment required by the means other than the object reaction force equilibrium control) obtained from the first component.

Further, the posture control system of a mobile robot 1, 300 is configured to have at least a body 3, a locomotive mechanism (leg links 2 or wheels 304) and at least one arm link 5 (or the arm 310) that can act a force on an object; characterized in that: desired motion generating means (desired working pattern generator 100) for generating desired motion (desired object reaction force or desired position/posture) comprising at least a desired arm link position/posture of the robot (desired hand position/posture) and a desired object reaction force that is a desired value of an object reaction force acting on the arm link from the object; posture stabilization controlling means (posture stabilization main controller 106) for detecting a posture inclination error of the robot (body inclination angle) and for correcting the desired motion such that the posture inclination error (specifically the posture stabilization compensating moment calculated based on the detected value) approaches zero; and an arm driver (actuator 90, 92) driving the arm link based on at least the corrected desired motion.

It should be noted that, in the foregoing, the sum of non-operation direction components of actual object reaction force about desired total floor reaction force central point may be calculated by subtracting the sum of operation direction components of actual object reaction force about desired total floor reaction force central point from the sum of all components of the actual object reaction force acting about the desired total floor reaction force central point. This is because the sum of the sum of operation direction components of actual object reaction force about desired total floor reaction force central point and the sum of non-operation direction components of actual object reaction force about desired total floor reaction force central point is equal to the sum of all components of the actual object reaction force acting about the desired total floor reaction force central point.

In contrast, the sum of operation direction components of actual object reaction force about desired total floor reaction force central point may be calculated by subtracting the sum of non-operation direction components of actual object reaction force about desired total floor reaction force central point from the sum of all components of the actual object reaction force acting about the desired total floor reaction force central point.

Concerning the sum of operation direction components of object reaction force about desired total floor reaction force central point and the sum of non-operation direction components of object reaction force about desired total floor reaction force central point, they may be obtained in a similar manner.

Further, in the posture stabilization main controller 106, the desired hand position/posture may be changed instead of correcting the desired object reaction force. To be more specific, since the arm main controller 104 normally can not control to make the object reaction force and the hand position/posture to desired values, trade-off works in the control of the object reaction force and the hand position/posture and as a result, the actual object reaction force may change even when only the desired hand position/posture is varied.

Accordingly, if a ratio of a change amount of the desired hand position/posture to change of the actual object reaction force (i.e., a compliance constant of the arm main control system) at that moment is available beforehand, by multiplying the correction amount of the desired object reaction force obtained in the aforesaid embodiment by the ratio, the correction amount of the desired hand position/posture can be obtained.

It should be also noted that, although the present invention has been described with reference to the humanoid robot having two leg links and two arm links as a legged mobile robot, the present invention can be applied to other legged mobile robots having any number of leg link(s) other than two or any robot that has one or more than two arm link(s).

Further, it should be also noted that, if the leg link acts on an object other than the floor, the leg link can be considered as an arm link. For example, if the robot is in an insect-type with six leg links that lifts an object using the two foreleg links, the two foreleg links should be considered as the arm links.

Further, although the dynamic unbalance of the robot has been explained as inclination relative to the X-axis and Y-axis directions, the present invention can be also applicable to spinning about the Z-axis due to swinging of a free leg or the like.

Further, although no actuator is provided for bending or twisting the body link, if such a body actuator is added, it will be necessary to provide a control system for a body actuator. However, since the bending or twisting of the body link is equivalent to have additional joints at the connecting points where the arms or legs are connected to the body, the body actuator will be regarded as a kind of arm or leg actuator conceptually. In other words, the body actuator control system can be included as a part of the control system of the arm or leg.

Further, in controlling the arm link, it is alternatively possible to use any means other than the virtual compliance control, e.g., to use means to control the electric actuators by a current-command-type amplifiers to control joint torques such that the object reaction force is controlled indirectly. It will be unnecessary to dispose a force sensor at the hand in that control, nevertheless, it will be preferable to dispose a force sensor for the object reaction force control system.

Further, it is alternatively possible to provide, instead of the force sensor 58 provided at the hand 40R(L), an estimator that estimates the actual object reaction force from the joint torque at the arm main controller. A prior art disturbance observer can be used as the estimator.

Further, in some cases, the desired object reaction force may be set to zero. For example, in the Work 4 described above, if friction between the handrail and the hand is almost zero, the desired object reaction force should preferably be set to zero. Also, in the Work 2, if friction of the universal caster wheels is unknown, it suffices if the desired object reaction force is set to zero. When the desired object reaction force is constantly zero, since the object reaction force's error is equal to the actual object reaction force, instead of the object reaction force's error, the actual object reaction force may be used in the foregoing.

Further, even if the floor is not flat, the invention can also be applied, by utilizing the technique, proposed by the applicant in Japanese Laid-open Patent Application No. 5 (1993)-318340, to suppose a virtual flat floor such that the desired total floor reaction force central point or the desired ZMP is determined on the virtual flat floor.

Further, it should be noted that it is possible to modify the block diagrams illustrated, such as, for example, changing the calculation sequence.

INDUSTRIAL FIELD IN WHICH THE INVENTION IS APPLICABLE

According to the present invention, in the posture control system of the mobile robot, when unexpected external force acts, it is configured to control to stabilize the posture of the robot driving the arm link(s) such that, in response to a first external force that is a component in a predetermined direction of the unexpected external force, a second external force acts on the arm link(s) in a direction orthogonal to the predetermined direction. Therefore, when the mobile robot is controlled to work that is likely to receive a reaction force from the object, even if the posture becomes unstable or the robot receives the unexpected reaction force acting from the object, it becomes possible to preserve the dynamic balance and to maintain a stable posture.

The invention claimed is:

1. A posture control system of a mobile robot having at least a body, a locomotive mechanism and at least one arm link that can act a force on an object;

comprising:
 a. predetermined direction component detecting means for detecting or estimating a first external force that is a component in a predetermined direction of external force acting on the at least one arm link, and
 b. posture stabilization controlling means for driving the at least one arm link in response to the first external force such that a second external force acts on the at least one arm link in a direction orthogonal to the predetermined direction, whereby a posture of the robot is stabilized.

2. A posture control system of a mobile robot having at least a body, a locomotive mechanism and at least one arm link that can act a force on an object;

comprising:
 a. desired motion generating means for generating desired motion comprising at least a desired arm link position/posture of the robot and a desired object reaction force that is a desired value of an object reaction force acting on the at least one arm link from the object;
 b. actual object reaction force detecting means for detecting or estimating an actual object reaction force that is an actual value of the object reaction force;
 c. posture stabilization controlling means for correcting at least one of the desired arm link position/posture and the desired object reaction force of the desired motion to stabilize a posture of the robot based on at least the detected or estimated actual object reaction force; and
 d. an arm driver driving the at least one arm link based on at least the corrected desired motion.

3. The system according to claim 2, wherein the posture stabilization controlling means corrects the desired motion to stabilize the posture of the robot based on at least an object reaction force's error indicating a difference between the actual object reaction force and the desired object reaction force.

4. The system according to claim 3, wherein the posture stabilization controlling means corrects the desired motion to cancel out all or a part of tilting force generated by a first component of the object reaction force's error by a second component obtained from the first component.

5. A posture control system of a mobile robot having at least a body, a locomotive mechanism and at least one arm link that can act a force on an object;

comprising:
 a. desired motion generating means for generating desired motion comprising at least a desired arm link position/posture of the robot and a desired object reaction force that is a desired value of an object reaction force acting on the at least one arm link from the object;
 b. posture stabilization controlling means for detecting a posture inclination error of the robot and for correcting at least one of the desired arm link position/posture and the desired object reaction force of the desired motion such that the posture inclination error approaches zero; and
 c. an arm driver driving the at least one arm link based on at least the corrected desired motion.

* * * * *

UNITED STATES PATENT AND TRADEMARK OFFICE
CERTIFICATE OF CORRECTION

PATENT NO. : 7,112,938 B2
APPLICATION NO. : 10/512819
DATED : September 26, 2006
INVENTOR(S) : Takenaka et al.

It is certified that error appears in the above-identified patent and that said Letters Patent is hereby corrected as shown below:

On the title Page of the Patent, Item (54) the title should read:

POSTURE CONTROL SYSTEM OF MOBILE ROBOT

Signed and Sealed this

Eighth Day of May, 2007

JON W. DUDAS
*Director of the United States Patent and Trademark Office*